US008185162B2

(12) United States Patent
Haskell et al.

(10) Patent No.: US 8,185,162 B2
(45) Date of Patent: May 22, 2012

(54) ELECTRICALLY TILTED ANTENNA SYSTEM WITH POLARISATION DIVERSITY

(75) Inventors: Philip Edward Haskell, Southsea (GB); Louis David Thomas, Malvern (GB); Stephen Thomas Newbold, Bicester (GB); David Edwin Barker, Stockport (GB)

(73) Assignee: Quintel Technology Limited, Bristol (GB)

( * ) Notice: Subject to any disclaimer, the term of this patent is extended or adjusted under 35 U.S.C. 154(b) by 312 days.

(21) Appl. No.: 12/514,292

(22) PCT Filed: Nov. 7, 2007

(86) PCT No.: PCT/GB2007/004237
§ 371 (c)(1),
(2), (4) Date: Jan. 25, 2010

(87) PCT Pub. No.: WO2008/056134
PCT Pub. Date: May 15, 2008

(65) Prior Publication Data
US 2010/0144289 A1 Jun. 10, 2010

(30) Foreign Application Priority Data
Nov. 10, 2006 (GB) .................................. 0622435.6

(51) Int. Cl.
*H04M 1/00* (2006.01)
(52) U.S. Cl. ....... 455/562.1; 455/121; 455/83; 343/751; 343/853; 343/893; 342/423; 342/434; 342/447
(58) Field of Classification Search .................. 455/13.3, 455/19, 25, 63.4, 82, 83, 562.1, 575.5, 575.7, 455/121, 129, 193.1; 343/824, 724, 726, 343/729, 751, 835, 844, 853, 855, 879, 893; 342/403, 406, 423, 430, 434, 437, 445, 446, 342/447
See application file for complete search history.

(56) References Cited

U.S. PATENT DOCUMENTS
5,001,494 A * 3/1991 Dorman et al. ............... 343/703
(Continued)

FOREIGN PATENT DOCUMENTS
WO     WO 03/043127         5/2003
(Continued)

OTHER PUBLICATIONS
Notification Concerning Transmittal of International Preliminary Report on Patentability for PCT/GB2007/004237; May 22, 2009, consists of 8 unnumbered pages.

*Primary Examiner* — Dominic E Rego

(57) ABSTRACT

An electrically tilted antenna system with polarization diversity has a dual polarized, tilt adjustable antenna (32). The antenna (32) has dipoles (34, 36) of two orthogonal polarizations associated with independently adjustable electrical tilt angles. The tilt angles are implemented by relative delays between corporate feed input or output signals, the delays being introduced by an antenna tilt assembly (54). Two signal feeders (F21, F22) associated with different antenna polarizations connect the antenna tilt assembly (54) to a base station filter assembly (50): the base station filter assembly 50 routes transmit signals from base stations (BS21, BS22) to different antenna polarizations via respective feeders (F21, F22) and the antenna tilt assembly (54). This assembly also divides receive signals from feeders (F21, F22) between both base stations (BS21, BS22). Each antenna polarization is associated with transmit and receive signals of a respective base station (BS21 or BS22) and with a polarization diversity signal of the other base station (BS22 or BS21). The antenna system may be used with two or more base stations operating with contiguous frequencies.

18 Claims, 14 Drawing Sheets

U.S. PATENT DOCUMENTS

| | | |
|---|---|---|
| 6,628,969 B1 * | 9/2003 | Rilling ............... 455/561 |
| 2002/0011954 A1 * | 1/2002 | Judd et al. ............ 343/700 MS |
| 2002/0147032 A1 * | 10/2002 | Yoon et al. ............ 455/562 |
| 2003/0058155 A1 * | 3/2003 | Landt ............... 342/42 |
| 2003/0184473 A1 * | 10/2003 | Yu ............... 342/380 |
| 2004/0046695 A1 * | 3/2004 | Brothers et al. ............ 342/427 |
| 2004/0145526 A1 * | 7/2004 | Puente Baliarda et al. ............ 343/700 MS |
| 2004/0209572 A1 * | 10/2004 | Thomas ............... 455/63.4 |
| 2005/0012665 A1 * | 1/2005 | Runyon et al. ............ 342/372 |
| 2008/0062062 A1 * | 3/2008 | Borau et al. ............ 343/844 |
| 2009/0224995 A1 * | 9/2009 | Puente et al. ............ 343/850 |

FOREIGN PATENT DOCUMENTS

WO    WO 2004/036785      4/2004

\* cited by examiner

ELECTRICALLY TILTED ANTENNA SYSTEM WITH POLARISATION DIVERSITY

This invention relates to an electrically tilted antenna system with polarisation diversity, i.e. a phased array antenna system with polarisation diversity and electrical tilt capability. It is relevant to many antenna systems such as those used for telecommunications, for example cellular mobile radio networks commonly referred to as mobile telephone networks. Such networks include second generation (2G) mobile telephone networks implemented by a cellular radio standard such as GSM and third generation (3G) mobile telephone networks implemented by a cellular standard such as the Universal Mobile Telephone System (UMTS). Other cellular radio standards include IS95 and WCMA2000.

Operators of conventional cellular radio networks generally employ their own base stations each of which is connected to one or more antennas. In such a network, the antennas are a primary factor in defining the desired coverage area which is generally divided into a number of overlapping cells, each associated with a respective antenna and base station. Each cell contains a fixed-location base station which maintains radio communication with mobile radios in that cell. Base stations are interconnected with one another for communication purposes, e.g. by fixed land lines arranged in a grid or meshed structure, allowing mobile radios throughout the cell coverage area to communicate with each other as well as with the public telephone network outside the cellular mobile radio network.

To improve and optimise communications performance in antenna systems used in cellular radio networks, it is known to use three techniques, space diversity, polarisation diversity and variable electrical tilt. The first such technique, i.e. space diversity, involves using two spaced apart antennas each giving rise to a respective received signal from a remote subscriber using a mobile telephone handset: this makes two received signals available from a single handset thereby providing a communications advantage.

Signals received by a base station undergo rapid fluctuations in power because they have traversed multipath environments: i.e. replicas of a signal transmitted from a mobile telephone handset pass via multiple paths or routes to a receiving base station, and the handset itself is in motion during transmission. Moreover, the replicas become decorrelated with one another. Signals received by a base station may be combined using, for example, Maximal Ratio Combining (MRC), which provides significant performance gains for an up-link channel from a mobile handset to a base station.

The second technique for improving communications performance, i.e. polarisation diversity, may be obtained by means of an antenna having two sets of antenna elements, each set providing an angle of maximum signal transmission or reception sensitivity which is orthogonal to that of the other set. Two signals received by such an antenna from a single mobile handset via different multipath routes are at least partly uncorrelated relative to one another, and consequently they may be combined to improve received signal quality.

The third technique for improving communications performance, i.e. variable electrical tilt, arises from the properties of a phased array of antenna elements. Such an antenna forms a main beam in response to in phase excitation of its antenna elements or excitation which varies across the array as a linear function of element position in the array. Changing the gradient of this function changes the inclination or angle of the main beam to the main beam direction which corresponds to in phase excitation. This allows an operator of a cellular mobile radio network to alter the angle of the main beam to the horizontal, which in turn adjusts the ground coverage area served by the antenna and enables interference to be reduced between messages associated with different cells: here a cell is a region with which an antenna communicates, and there may be more than one cell per antenna.

Operators of cellular radio network face increasing demand for traffic capacity, but are subject to planning or zoning restrictions which limit deployment of new sites or addition of antennas to existing sites. Consequently it is desirable to increase antenna traffic capacity without adding antennas, e.g. by operators sharing an antenna, while retaining capability for polarisation diversity and adjustment of respective angles of electrical tilt by individual users (operators (Europe), or carriers (USA)) independently of one another.

It is an object of the invention to provide for polarisation diversity at an antenna site with independent angles of electrical tilt being available for two operators.

The present invention provides an antenna system including:
a) a dual polarised antenna with electrical tilt adjustable polarisations;
b) a respective corporate feed means for relaying intermediate signals between each antenna polarisation and delaying means, each corporate feed means being arranged to provide for the electrical tilt of the associated antenna polarisation to be adjustable in response to relative delay of a plurality of intermediate signals and the delaying means providing for intermediate signals to be subject to relative delays;
c) a respective signal feeder associated with each antenna polarisation; and
d) two stations each for at least one of receiving and transmitting signals via the antenna polarisations and signal feeders, the antenna system being arranged such that each antenna polarisation is associated with a signal of one respective station and with a polarisation diversity signal of the other respective station.

The invention provides the advantage that it provides capability for two operators associated with respective stations (e.g. base stations) to share a single antenna and obtain receive and/or transmit signals with polarisation diversity, each operator having a respective angle of electrical tilt independent of that of the other operator. Embodiments of the invention will be described which allow the use of more than two stations and antennas which tilt in response to phase difference associated with two or more intermediate signals per polarisation. Moreover, the two stations may have contiguous operating frequencies.

Where at least one station is used for transmitting signals, the delaying means may comprise means for processing the at least one station's transmit signal into two intermediate signals with relative delay therebetween. Where the stations are at least for receiving signals, the delaying means may comprise means for processing a respective plurality of intermediate signals from each corporate feed to provide independently variable relative delays between pairs of signals for independent adjustment of electrical tilt of antenna beams associated with different stations.

The delaying means may incorporate hybrids for combining relatively delayed pairs of signals for relaying to the stations via the signal feeders. It may incorporate frequency conversion means arranged to filter relatively delayed signals at a reduced frequency. The frequency conversion means may be local oscillator means for frequency conversion and arranged to enable filtering of relatively delayed signals at a reduced frequency and to implement signal delay by local oscillator signal phase shifting.

The stations may be located remotely from the antenna, the delaying means being incorporated in an antenna tilt assembly co-located with the antenna and the signal feeders connecting the antenna tilt assembly to station circuitry associated with the stations. The station circuitry may be arranged to divide signals received via the signal feeders between the stations to provide each station with a receive signal associated with one respective antenna polarisation and a polarisation diversity signal associated with the other respective antenna polarisation.

In another aspect, the present invention provides a method of operating an antenna system having a dual polarised antenna with electrical tilt adjustable polarisations providing polarisation diversity and a respective corporate feed means associated with each antenna polarisation and providing for the electrical tilt of that antenna polarisation to be adjustable in response to relative delay of a plurality of intermediate signals, the method including:

a) relaying intermediate signals between each antenna polarisation and providing for intermediate signals to be subject to relative delays;
b) providing a respective signal feeder associated with each antenna polarisation; and
c) using two stations each for at least one of receiving and transmitting signals via the antenna polarisations and signal feeders, each antenna polarisation being associated with a signal of one respective station and with a polarisation diversity signal of the other respective station.

As has been said, the invention provides the advantage that it provides capability for two operators associated with different stations to share a single antenna and obtain receive and/or transmit signals with polarisation diversity, each operator having a respective independent angle of electrical tilt. Moreover, the two stations may have contiguous operating frequencies.

Where at least one station is provided for transmitting signals, the intermediate signals may be made subject to relative delays by processing the at least one station's transmit signal into two intermediate signals with relative delay therebetween. Where the stations are provided at least for receiving signals, the intermediate signals may be made subject to relative delays by processing a respective plurality of intermediate signals from each corporate feed to provide independently variable relative delays between pairs of signals for independent adjustment of electrical tilt of antenna beams associated with different stations.

The intermediate signals may be made subject to relative delays by means of hybrids for combining relatively delayed pairs of signals for relaying to the stations via the signal feeders. Such relative delays may be implemented using frequency conversion means and filtering relatively delayed signals at a reduced frequency. The frequency conversion means may be local oscillator means for frequency conversion and arranged to enable filtering of relatively delayed signals at a reduced frequency and to implement signal delay by local oscillator signal phase shifting.

The stations may be located remotely from the antenna, the intermediate signals being made subject to relative delays in an antenna tilt assembly co-located with the antenna and the signal feeders connecting the antenna tilt assembly to station circuitry associated with the stations. The station circuitry may divide signals received via the signal feeders between the stations to provide each station with a receive signal associated with one respective antenna polarisation and a polarisation diversity signal of associated with the other respective antenna polarisation In order that the invention might be more fully understood, embodiments thereof will now be described, by way of example only, with reference to the accompanying drawings, in which:—

Figure 2:
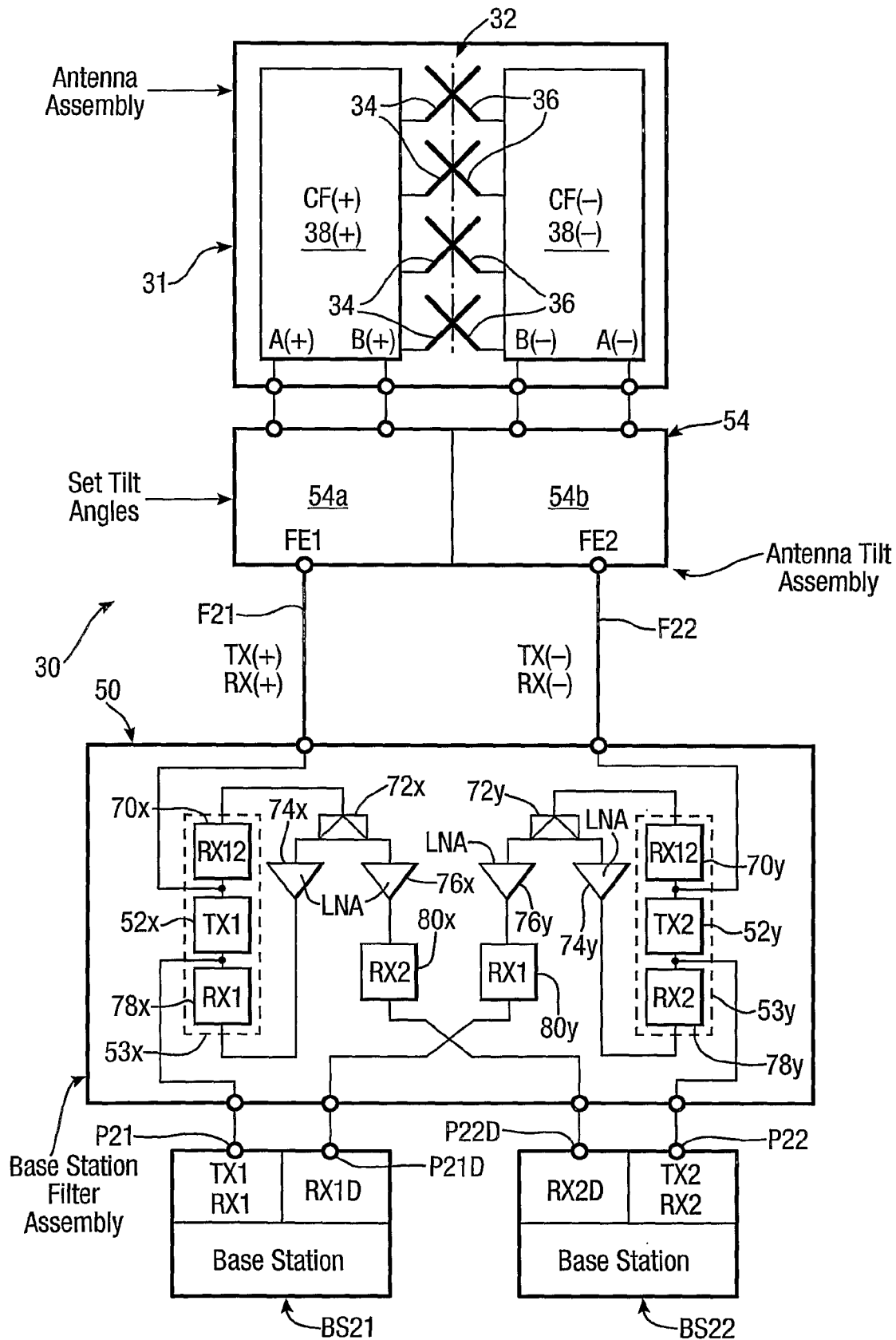
FIG. 2 shows an antenna system of the invention for communications with polarisation diversity.
Figure 3:
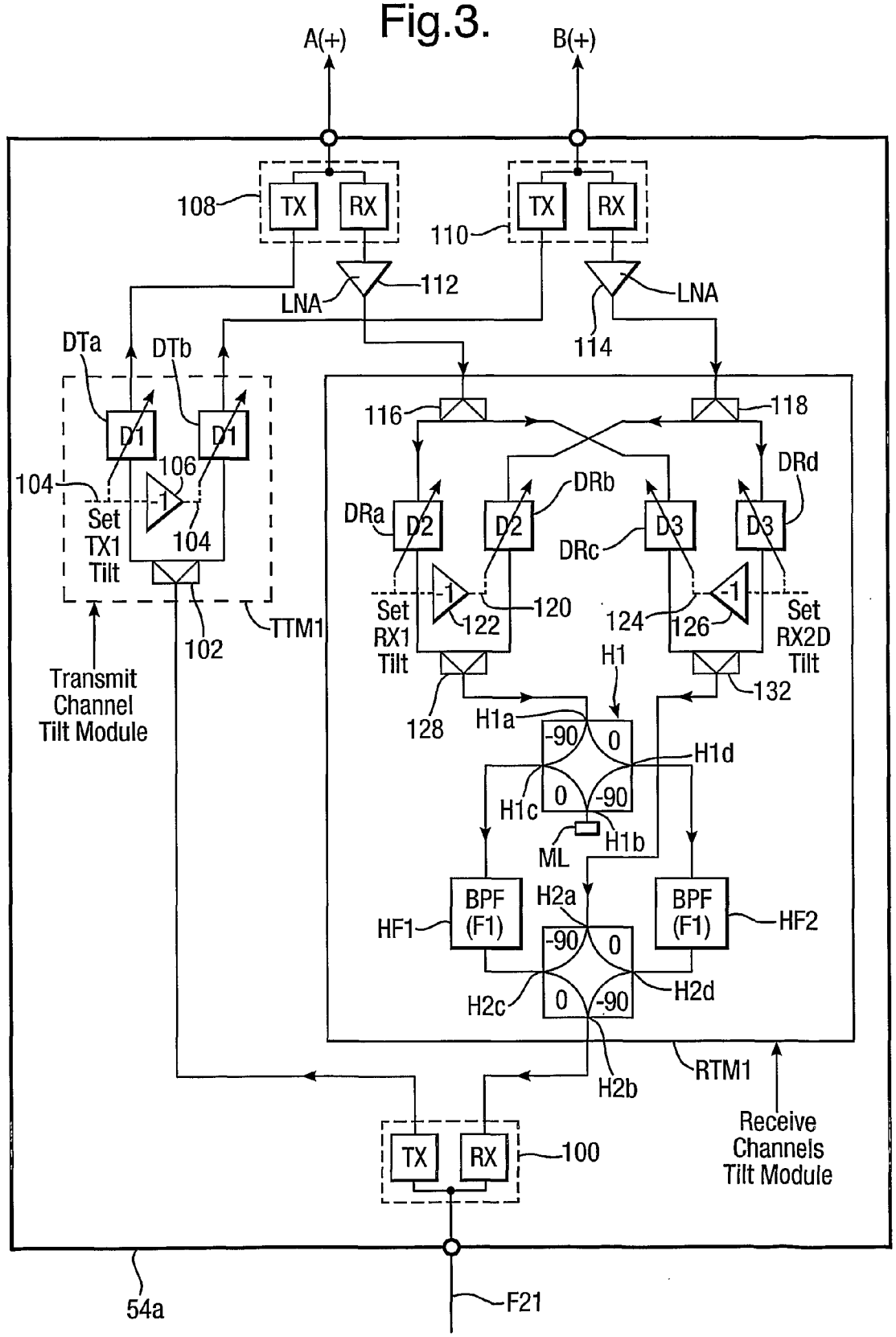
FIG. 3 is a circuit diagram of half of an antenna tilt assembly for use in the antenna system of FIG. 2.
Figure 4:
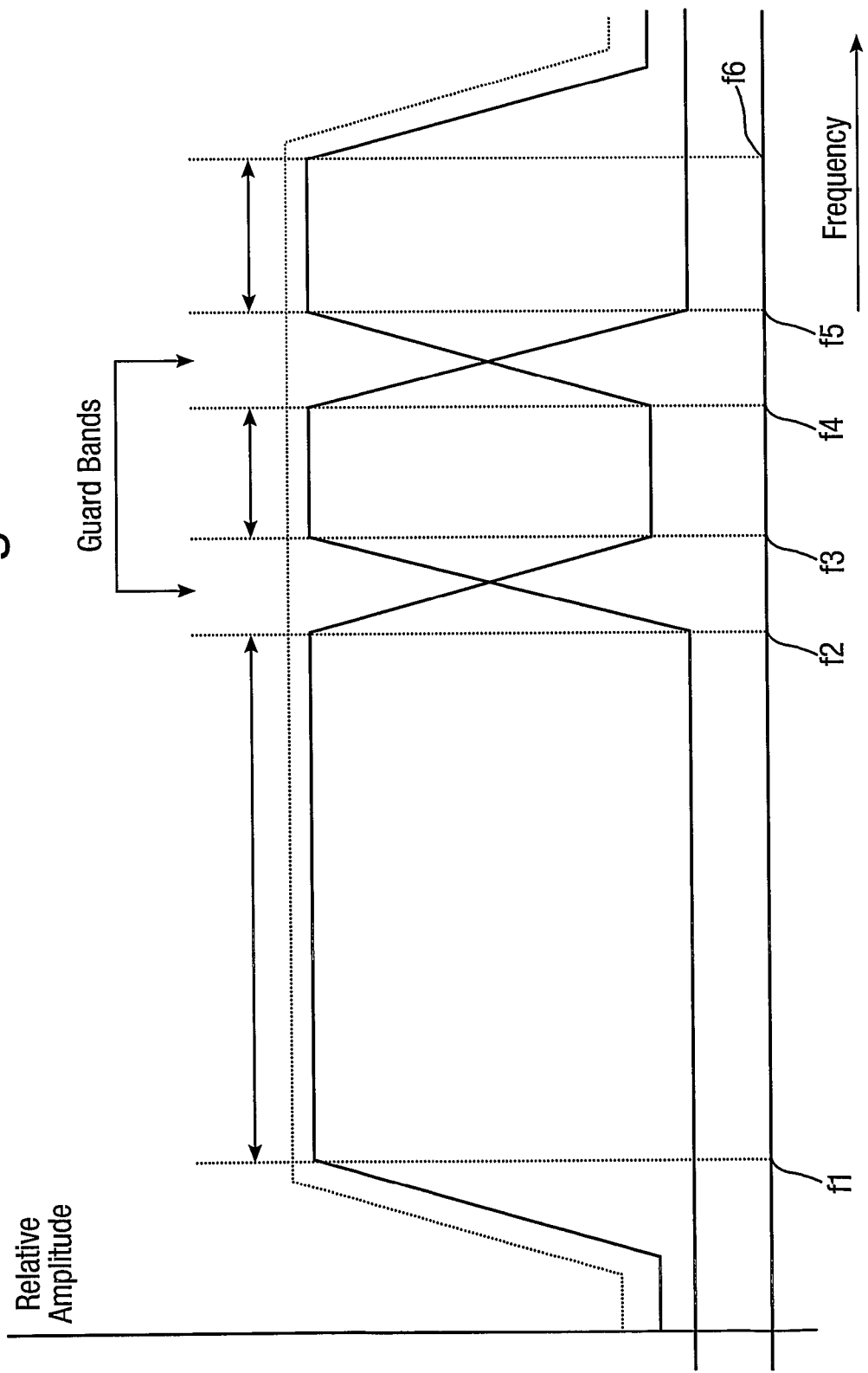
Figure 5:
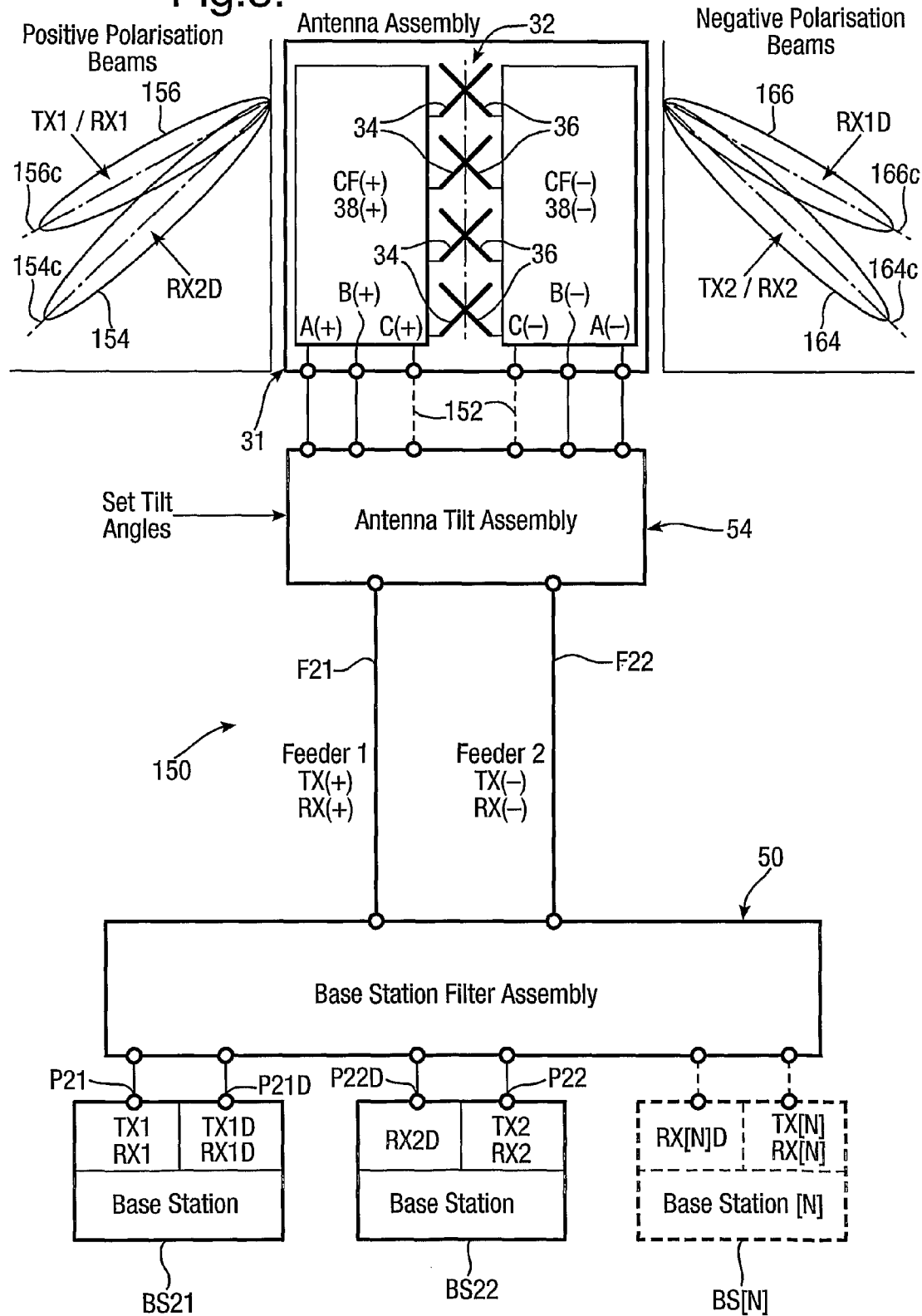
Figure 6:
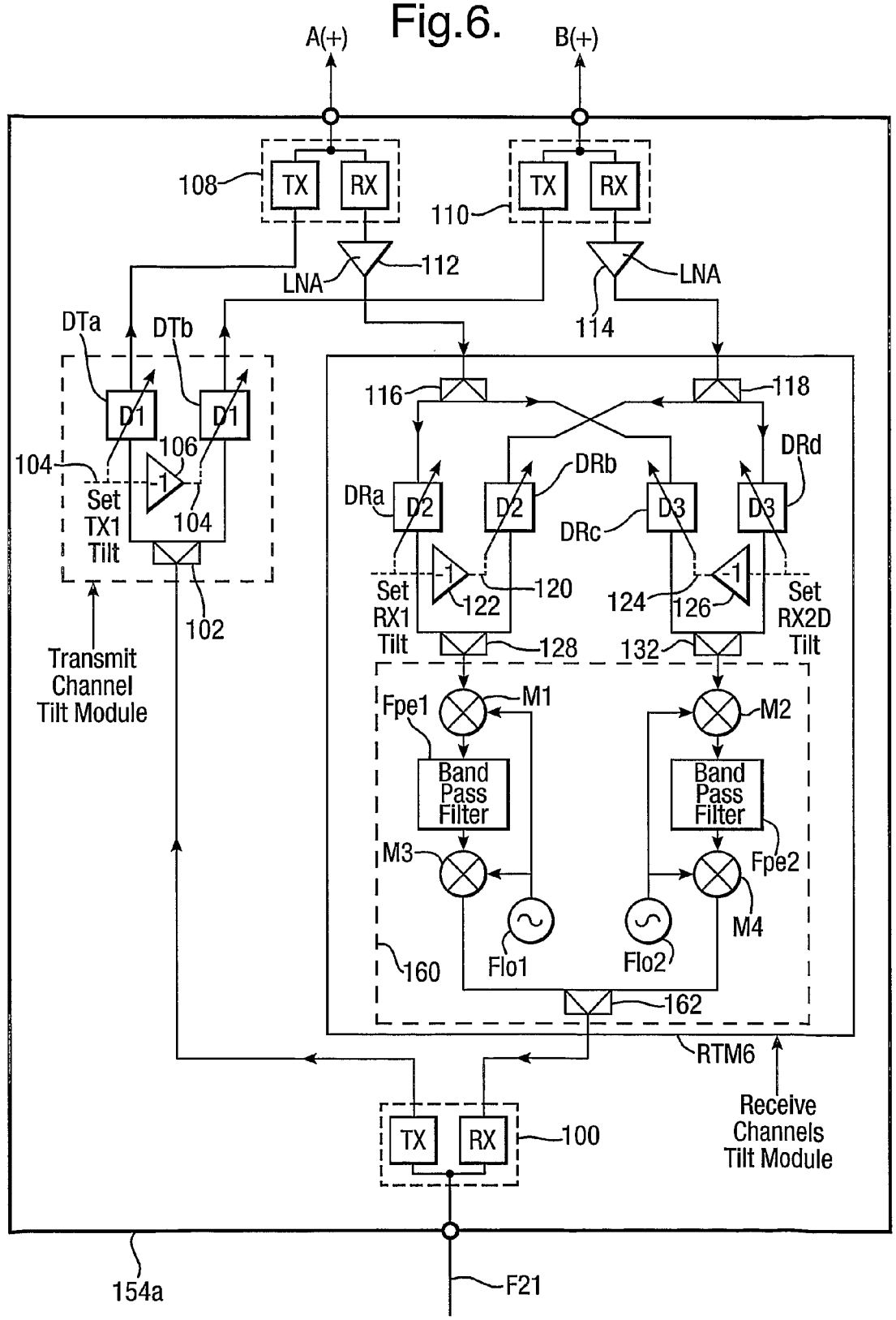
Figure 7:
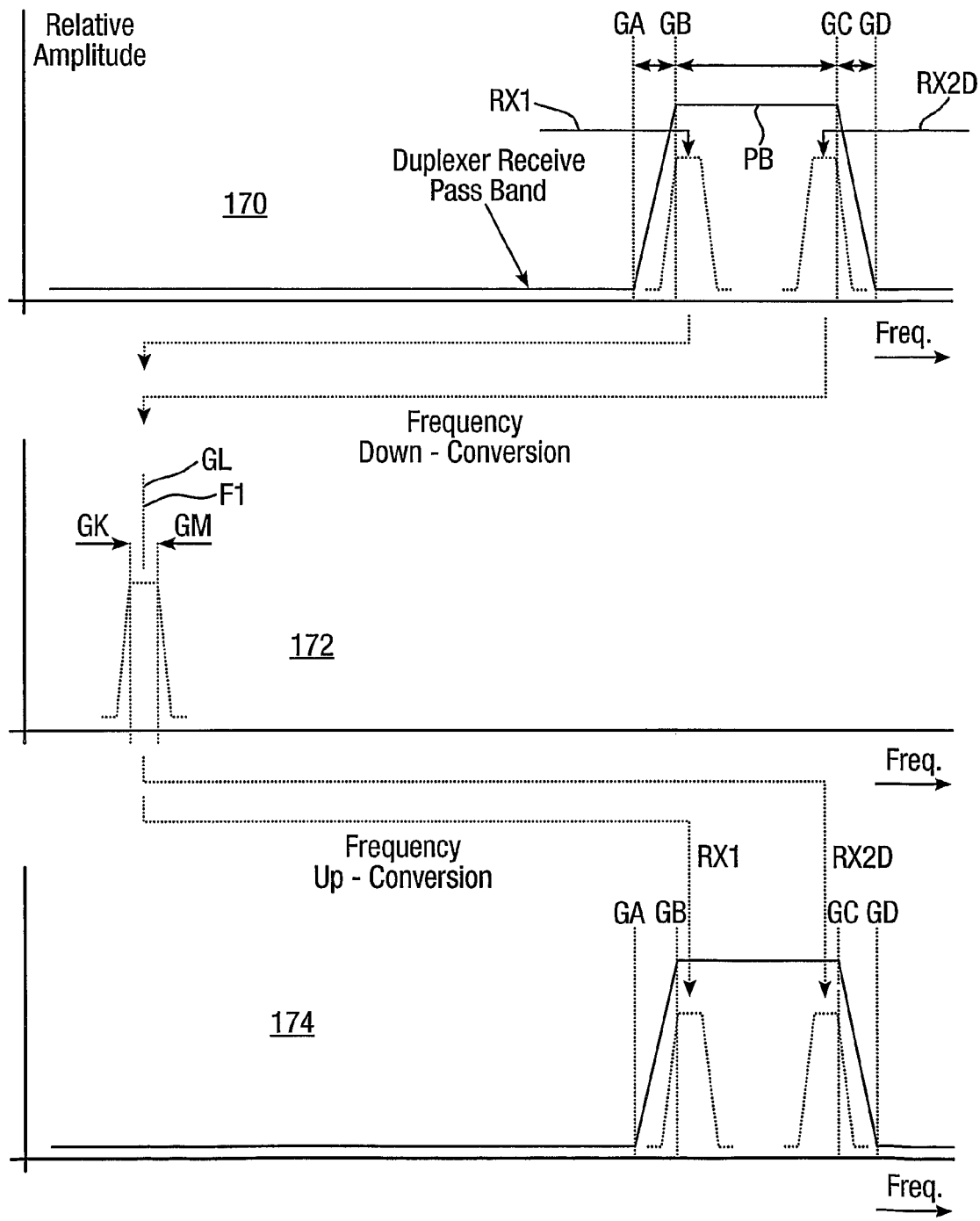
Figure 8:
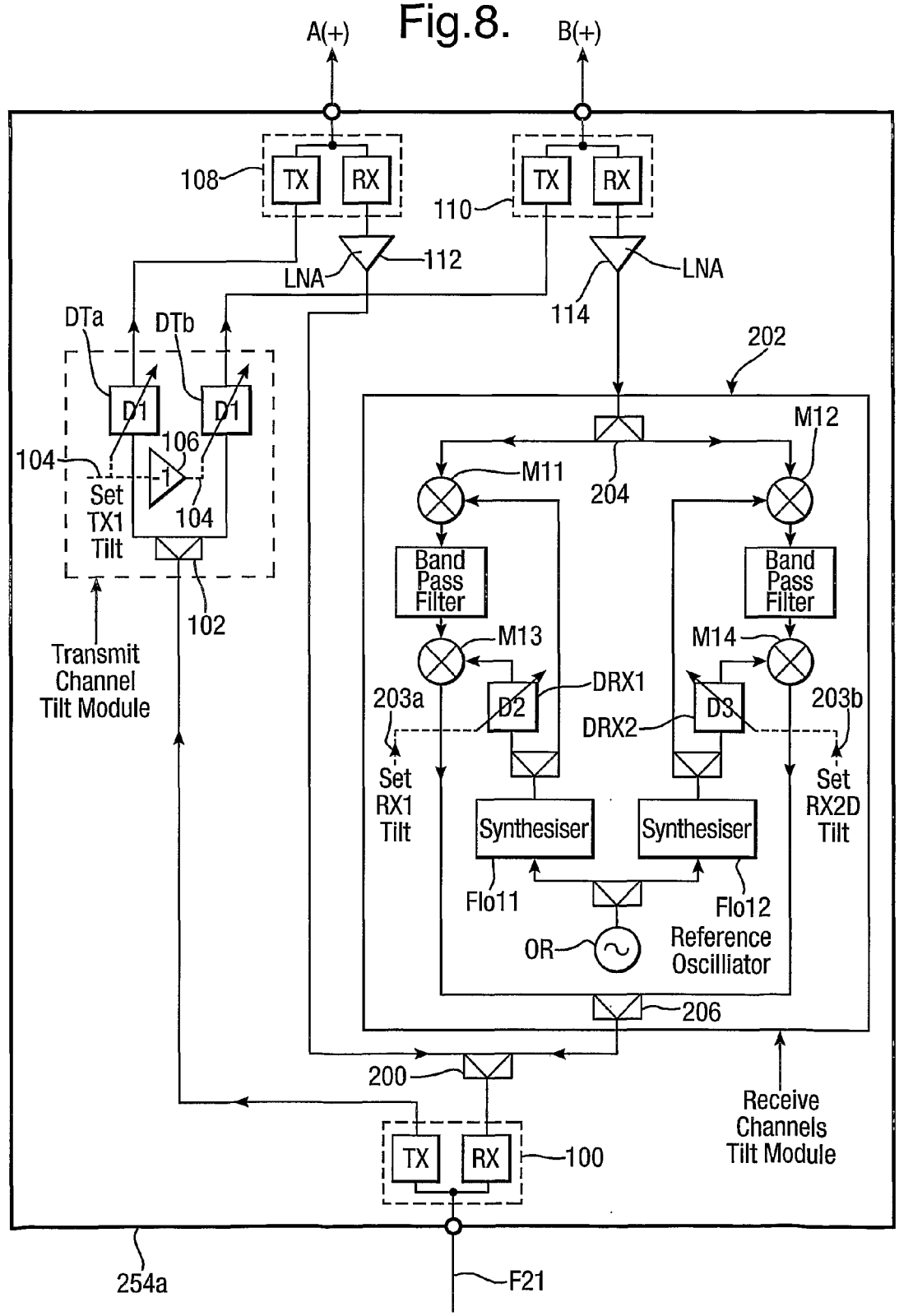
Figure 9:
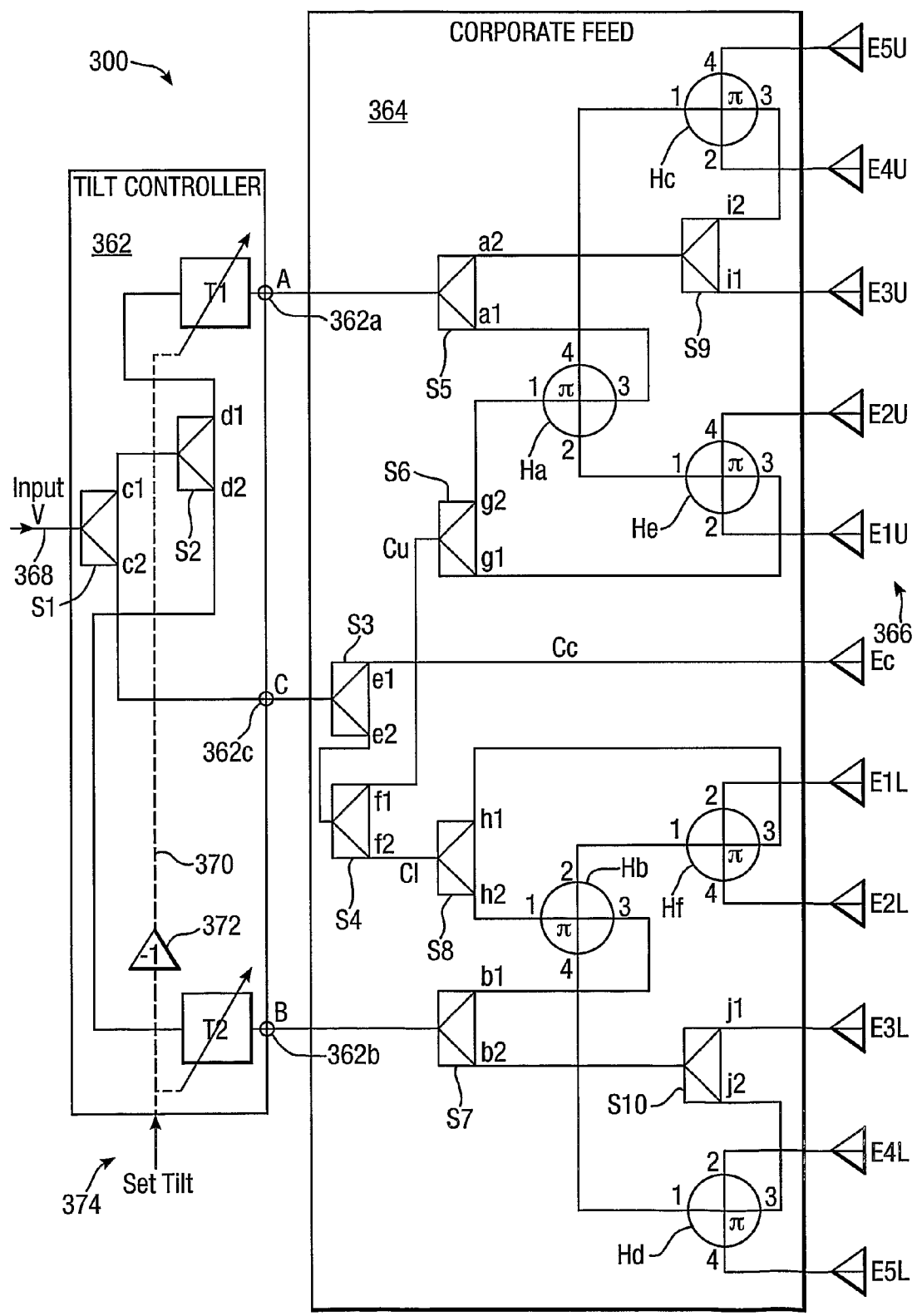
Figure 10:
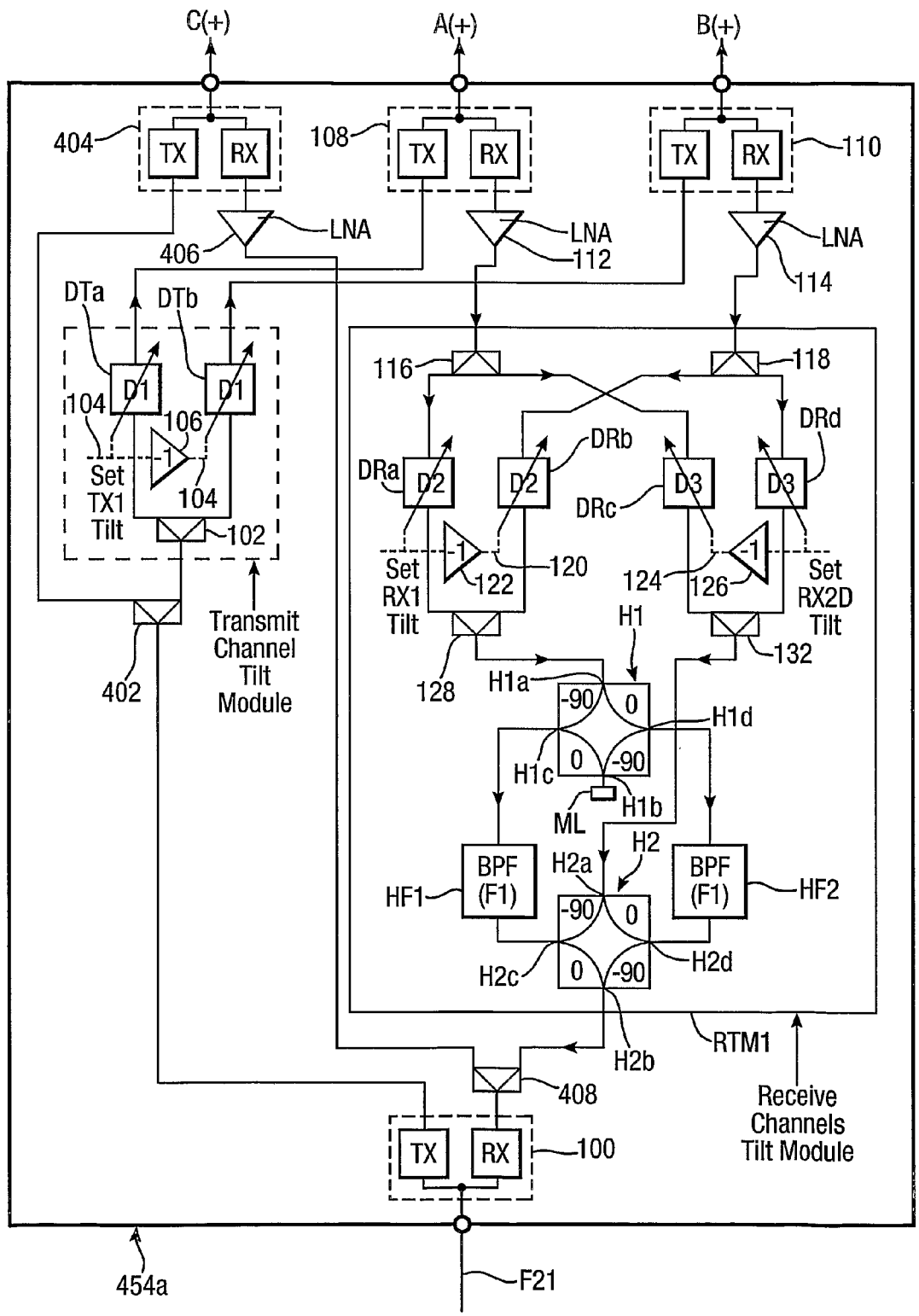
Figure 11:
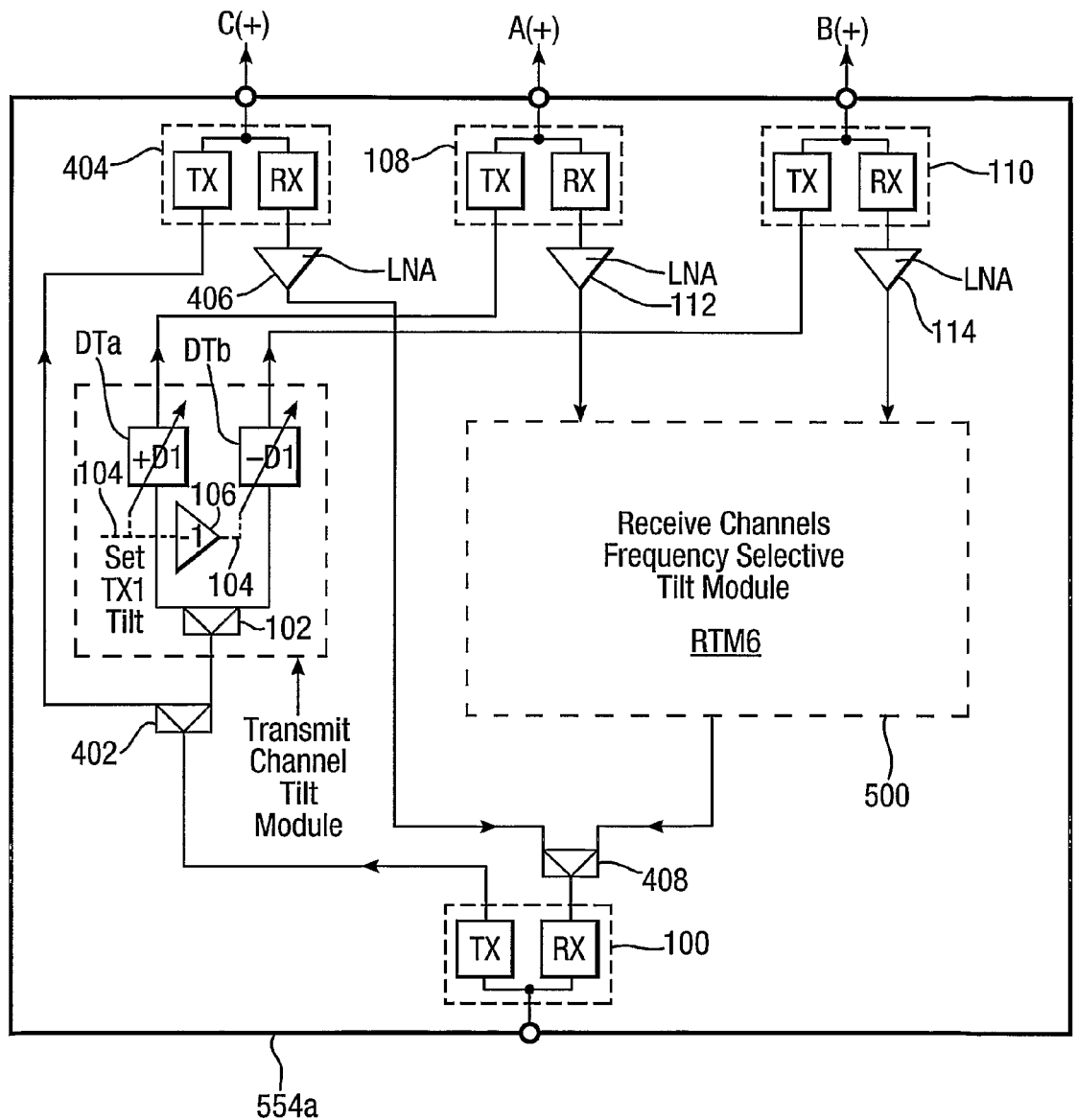
Figure 12:
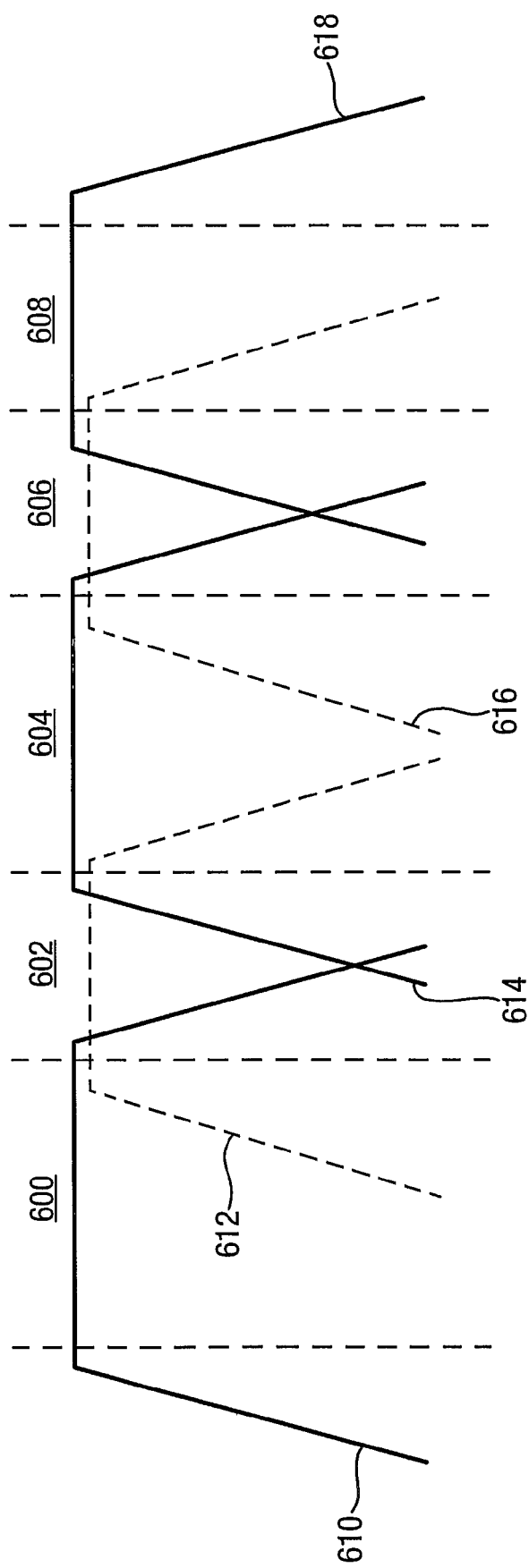
Figure 13:
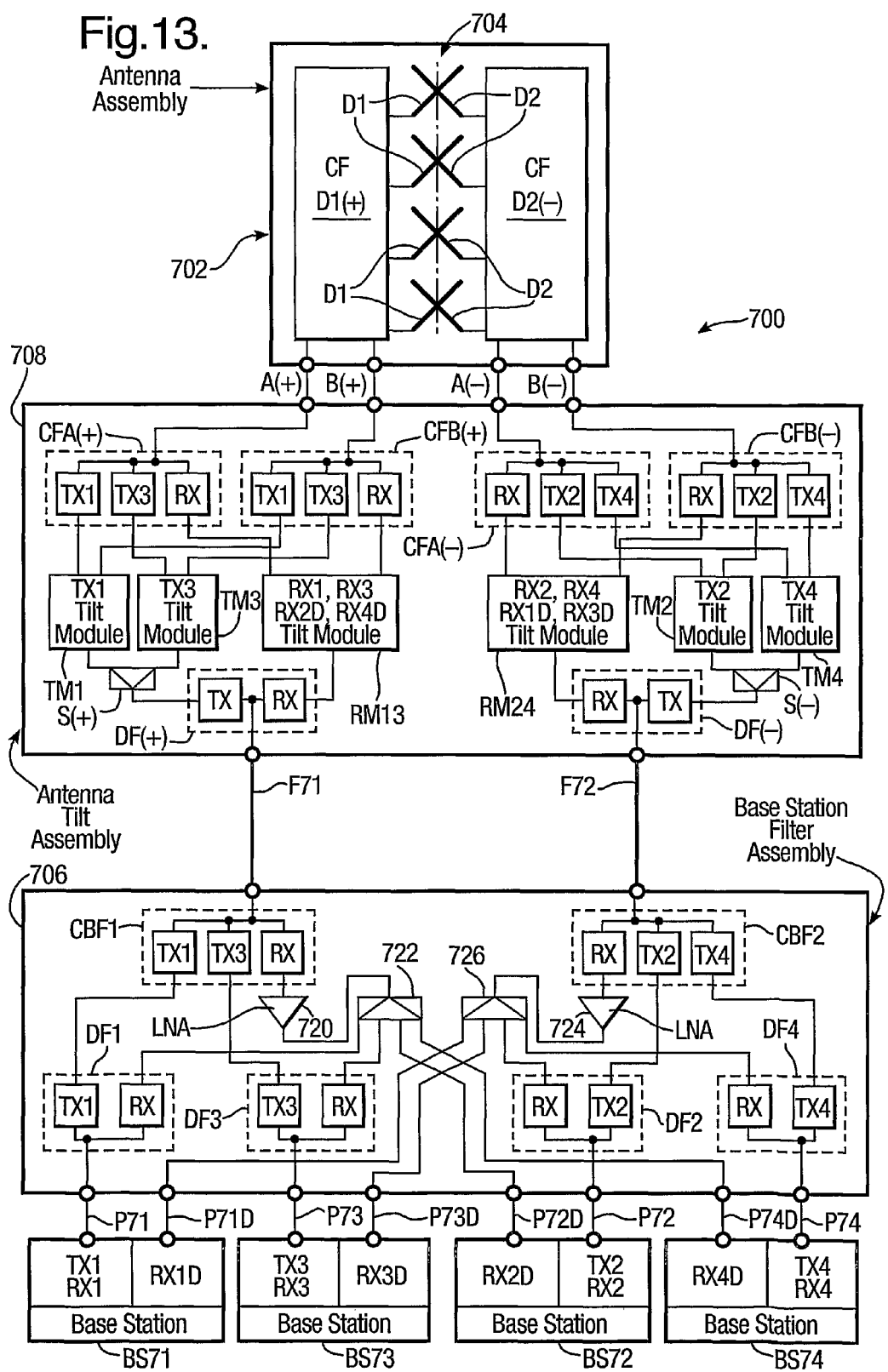
Figure 14:
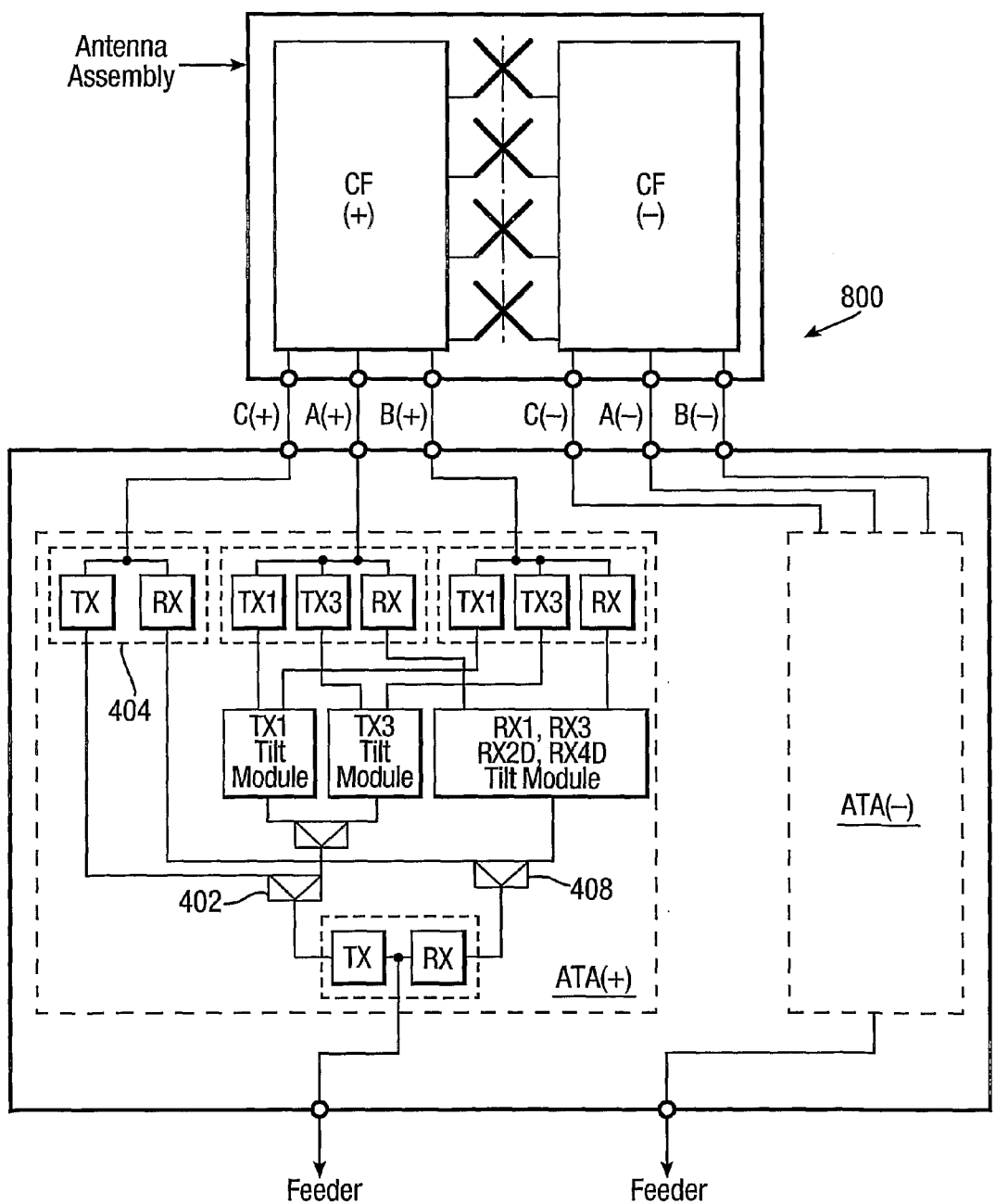

FIG. 4 provides graphs illustrating signal frequencies of operation of the FIG. 3 circuit;

FIG. 5 illustrates antenna beams and addition of base stations for the antenna system of FIG. 2;

FIG. 6 is a circuit diagram of an alternative to the half antenna tilt assembly of FIG. 3;

FIG. 7 provides graphs illustrating signal frequencies of operation of the FIG. 6 circuit;

FIG. 8 is a circuit diagram of a further alternative to the half antenna tilt assembly of FIGS. 3 and 6;

FIG. 9 is a drawing of a circuit for controlling antenna beam electrical tilt in response to phase differences between three signals;

FIG. 10 is a circuit diagram of half of an antenna tilt assembly providing three signals with phase differences for controlling antenna beam electrical tilt;

FIG. 11 shows an alternative to the circuit of FIG. 10;

FIG. 12 illustrates filter characteristics for contiguous frequency bands;

FIG. 13 shows an implementation of the invention for four base stations; and FIG. 14 is a modified version of the circuit of FIG. 13 to provide three signals with phase differences for controlling antenna beam electrical tilt.

In this specification (unlike nomenclature in the USA), a "carrier" means a carrier frequency, i.e. a radio frequency signal to which modulation is applied for telecommunications purposes, and "channel" is a frequency channel and effectively synonymous with carrier. One or more carriers may be used either by a single operator, or two or more operators, an operator being a user of a base station providing a mobile telephone communications service. Multiple carriers are not necessarily allocated to the same cellular radio system. Paired transmit and receive signals are indicated by TX and RX respectively with like numerical suffix, e.g. TX1 and RX1 or TX2 and RX2. Here the numerical suffix 1 or 2 indicates a first or second transmit or receive carrier frequency, and association with a first or second operator or base station. Polarisation diversity transmit and receive signals are indicated by a suffix D, e.g. in TXD, RXD, TX1D, RX1D etc. Up-link means a signal passing from a mobile telephone handset to a base station, and down-link means a signal passing in the reverse direction.

Figure 1:
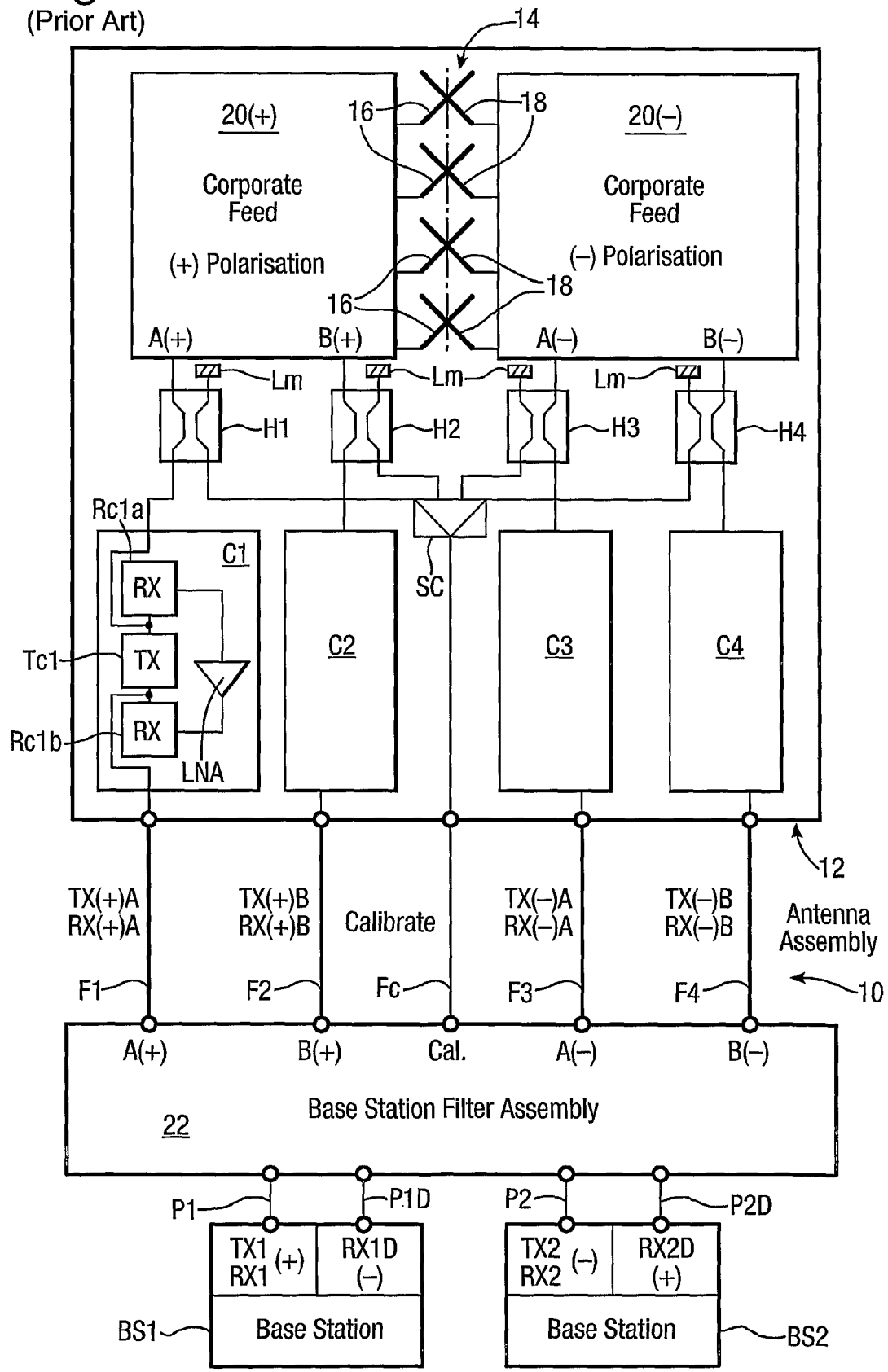
FIG. 1 shows a prior art antenna system for communications with polarisation diversity.

Referring to FIG. 1, reference numeral 10 indicates generally a prior art antenna system shared between two operators with polarisation diversity provided by an antenna assembly 12 with a dual polarisation phased array antenna 14. The antenna 14 is a single antenna comprising a vertical array of antenna elements in the form of crossed dipoles 16 and 18 with mutually orthogonal polarisations: i.e. the dipoles 16 and 18 have polarisations which are +45 and −45 degrees to the vertical and slanting upwards to the right (herein positive (+) polarisation) and upwards to the left (herein negative (−) polarisation) respectively. Positive polarisation dipoles 16 are connected to a positive polarisation corporate feed 20(+) and negative polarisation dipoles 18 are connected to a negative polarisation corporate feed 20(−). The corporate feeds 20(+)

and 20(−) have two input/output ports A(+), B(+) and A(−), B(−). Each of the corporate feeds 20(+) and 20(−) is of the kind described in published international application no. WO 2004/102739: such a corporate feed processes two input signals at its ports and converts them into drive signals for antenna elements of a phased array antenna; these two input signals are represented by vectors A and B which have equal amplitude but which have a phase difference between them, and changing the phase difference alters the angle of electrical tilt of the antenna.

Strictly speaking signals have arbitrary polarisation within an antenna installation, i.e. before transmission from or after reception by an antenna, but it is convenient to label signals and associated apparatus elements with polarisations because they are associated with a polarisation at an antenna when later transmitted or when earlier received.

The system 10 has two base stations BS1 and BS2 each with a respective first port P1, P2 and a respective second port PD1, PD2: in each case the first port is for transmit and receive signals TX1, RX1 or TX2, RX2, and the second port is for polarisation diversity receive signals RX1D or RX2D only: i.e. there are no polarisation diversity transmit signals in the system 10. The base stations' first and second ports P1, P2, PD1, PD2 are all connected to a base station filter assembly 22. Five feeders connect the base station filter assembly 22 to the antenna assembly 12, these feeders being first, second, third and fourth communications signal feeders F1 to F4 and one calibration signal feeder Fc.

The base station filter assembly 22 controls the phase differences between signals input to the corporate feeds 20(+) and 20(−), which in turn control antenna electrical tilt.

Each of the first to fourth communications signal feeders F1, F2, F3 or F4 is connected to a respective corporate feed port A(+), B(+), A(−) or B(−) via a respective filter/amplifier circuit C1, C2, C3 or C4 in series with a respective first, second, third or fourth hybrid circuit H1, H2, H3 or H4. Filter/amplifier circuit C1 has one band pass filter Tc1 in a transmit signal path from the first signal feeder F1 to first hybrid circuit H1; this circuit also provides a receive signal path from the first signal feeder F1 to the first hybrid circuit H1 consisting of a series arrangement of a receive band pass filter Rc1$a$, a low noise amplifier LNA and another receive band pass filter Rc1$b$. Filter/amplifier circuits C2, C3 and C4 are of like construction to filter/amplifier circuit C1, and provide similar transmit and receive signal paths between signal feeder F2, F3 or F4 and second, third or fourth hybrid circuit H2, H3 or H4 respectively.

The four hybrid circuits H1 to H4 are connected to a splitter/combiner SC itself connected to the calibration signal feeder Fc, and have fourth terminals terminated in matched loads Lm. They are used in a calibration mode of operation only: in this mode, a calibration signal is fed from the base station filter assembly 22 via the calibration signal feeder Fc and split at SC. The resulting split signals are fed via the hybrid circuits H1 to H4 to the corporate feed ports A(+), B(+), A(−) and B(−) respectively. Signals received at the antenna 14 in response to the calibration signal are monitored and used to adjust signal phase in receiving circuitry, e.g. to compensate for unequal lengths of feeders F1 to F4 by adding or removing lengths of cable to each of these feeders so that all have the same electrical length.

In operation of the prior art antenna system 10 in transmit mode, the base station filter assembly 22 divides a transmit (TX1) signal from the first base station's first port P1 into two signals (TX(+)A, TX(+)B)) for input to the feeders F1 and F2 respectively, i.e. two signals associated with +45 or positive dipole polarisation; the base station filter assembly 22 inserts and controls a phase difference between these two signals, which pass to the ports A(+) and B(+) of the positive polarisation corporate feed 20(+) via communications signal feeders F1 and F2, filter/amplifier circuits C1 and C2 and hybrid circuits H1 and H2 respectively. Consequently, the positive polarisation ports A(+) and B(+) receive input signals respectively with a phase difference between them controlling the angle of electrical tilt of the antenna beam associated with the positive polarisation corporate feed 20(+) as described in international application no. WO 2004/102739.

Similarly, the base station filter assembly 22 divides a transmit (TX2) signal from the second base station's first port P2 into two signals for input to the feeders F3 and F4 respectively, i.e. two signals associated with −45 or negative dipole polarisation; the base station filter assembly 22 inserts and controls a phase difference between these two signals, which pass to the ports A(−) and B(−) of the negative polarisation corporate feed 20(−) via communications signal feeders F3 and F4, filter/amplifier circuits C3 and C4 and hybrid circuits H3 and H4 respectively. Consequently, the negative polarisation ports A(−) and B(−) receive input signals respectively with a phase difference between them controlling the angle of electrical tilt of the antenna beam associated with the negative polarisation corporate feed 20(−).

The prior art antenna system 10 operates in a similar manner in receive mode, but in the reverse direction; i.e. signals received by the antenna 14 are phase processed by the two corporate feeds 20(+) and 20(−), which convert them into a positive polarisation pair of signals for output at ports A(+) and B(+) and a negative polarisation pair of signals for output at ports A(−) and B(−). The processed receive signals output from corporate feed ports A(+), B(+), A(−) and B(−) are fed via the hybrid circuits H1 to H4 and filter/amplifier circuits C1 to C4, to the communications signal feeders F1 to F4 respectively. The base station filter assembly 22 inserts and controls a phase difference between the receive signals on first and second communications signal feeders F1 and F2, and then combines them and feeds the resulting combination as receive signal RX1 to the first base station's first port P1. The base station filter assembly 22 also inserts and controls another phase difference between the receive signals on third and fourth communications signal feeders F3 and F4, and then combines them and feeds the resulting combination signal as receive signal RX2 to the second base station's first port P2.

The base station filter assembly 22 also provides polarisation diversity receive signals RX1D and RX2D by cross-connections between base stations and antenna polarisations: i.e. the first base station's second port P1D has input of the combination signal derived from receive signals on third and fourth communications signal feeders F3 and F4, and the second base station's second port P2D has input of the combination signal derived from receive signals on first and second communications signal feeders F1 and F2. Each base station BS1 or BS2 has receive filters (not shown) to distinguish its receive frequency RX1 or RX2 from that of the other base station.

The prior art antenna system 10 provides polarisation diversity in receive (but not transmit) mode, and each base station BS1 or BS2 has its own independently controllable angle of electrical tilt since each is associated with a respective pair of signals input to a respective corporate feed 20(+) or 20(−) controlling tilt of a respective antenna beam polarisation.

The prior art polarisation diversity antenna system 10 has a number of disadvantages:

(a) The number of feeders required for two base stations to have independently controllable angles of electrical tilt is increased from two (i.e. for the case where they have the same angle) to four per antenna, either by providing two additional feeders or by replacing two existing feeders with four new feeders:

(b) Each additional feeder must have low loss, and consequently relatively large size and cost, in order to convey transmit signals to the antenna;

(c) All feeders must be phase matched, and feeders preferably have the same electrical length to avoid frequency dependent tilt errors;

(d) Since the feeders are long, typically 30 m or more, phase matching requires measurement and adjustment of phase delay at the time of installation including for previously installed feeders which are re-used;

(e) The additional feeders require re-rigging of an antenna support mast assembly and removal if existing feeders are not to be used; and (f) The range of adjustment of the angle of electrical tilt is limited, for a system in accordance with international application no. WO 2004/102739.

FIG. 2 shows an antenna system 30 of the invention having an antenna assembly 31 with a dual polarised phased array antenna 32 equivalent to the antenna 14 described with reference to FIG. 1. The antenna 32 is of the kind which has an angle of electrical tilt that is set by corporate feed input signal phase difference. It is a single antenna comprising a vertical array of antenna elements in the form of crossed dipoles 34 and 36 with mutually orthogonal polarisations: i.e. the dipoles 34 and 36 have polarisations which are orthogonal to one another, at +45 and −45 degrees to the vertical and slanting upwards to the right (positive (+) polarisation) and upwards to the left (negative (−) polarisation) respectively. Positive polarisation dipoles 34 are connected to a positive polarisation corporate feed 38(+) and negative polarisation dipoles 36 are connected to a negative (−) polarisation corporate feed 38(−). The corporate feeds 38(+) and 38(−) have two input/output ports A(+), B(+) and A(−), B(−). Each of the corporate feeds 38(+) and 38(−) is of the kind described in published international application no. WO 2004/102739: it processes two input signals at its ports A(+), B(+) and A(−), B(−) and converts them into drive signals for antenna elements 34 or 36, and the phase difference between the input signals controls the angle of electrical tilt of the antenna polarisation (+) or (−) associated with those elements.

The antenna system 30 has first and second base stations BS21 and BS22. The first base station BS21 has two ports P21 and P21D: one port P21 is for first transmit and receive (TX1/RX1) signals, and the other port P21D is for polarisation diversity first receive (RX1D) signals only. Similarly, the second base station BS22 has two ports P22 and P22D for second transmit and receive (TX2/RX2) signals, and for polarisation diversity second receive (RX2D) signals, respectively.

The expressions "narrow band" and "broad band" will be used in relation to filters in the description of this and later embodiments: "narrow band" means a sufficiently narrow pass band to pass only one (e.g. TX1) of a number of transmit frequencies in the case of transmit filters or only one (e.g. RX1) of a number of receive frequencies in the case of receive filters; "broad band" means a sufficiently broad pass band to pass more than one at least or all transmit frequencies in the case of transmit (TX) filters or more than one at least or all receive frequencies in the case of receive (RX) filters.

A first transmit (TX1) signal passes from the first base station BS21 via port P21 to a base station filter assembly 50 co-located with the base stations BS21 and BS22 (e.g. at the foot of an antenna mast). This signal is filtered by a narrow band (TX1) transmit band pass filter 52$x$ in a TX1/RX1/RX12 filter unit 53$x$; it is then output to a first feeder F21 which transfers it to an antenna tilt assembly 54, which will be described in more detail with reference to FIG. 3. Here it is split into two signals with a variable (i.e. operator controllable) relative delay or phase shift between them, and the two signals are filtered and fed to the two input/output ports A(+) and B(+) of the positive polarisation corporate feed 38(+), which converts them into drive signals for positive polarisation antenna elements 34.

Similarly, a second transmit (TX2) signal passes from the second base station BS22 via port P22 to the base station filter assembly 50. This signal is filtered by a narrow band (TX2) transmit band pass filter 52$y$ in a TX2/RX2/RX12 filter unit 53$y$; it is then output to a second feeder F22 which transfers it to the antenna tilt assembly 54. Here it is split into two signals with a variable relative delay, and the two signals are filtered and fed to the two input/output ports A(−) and B(−) of the negative polarisation corporate feed 38(−), which converts them into drive signals for negative polarisation antenna elements 36.

The antenna system 30 operates similarly in receive mode, but in reverse; i.e. signals received by the antenna 32 are phase processed by the corporate feeds 38(+) and 38(−), which convert them into a positive polarisation pair of receive signals for output at ports A(+) and B(+) and a negative polarisation pair of receive signals for output at ports A(−) and B(−). The positive polarisation pair of receive signals output from corporate feed ports A(+) and B(+) are fed to the left hand side 54$a$ of the antenna tilt assembly 54 using phase and length matched jumper cables: the tilt assembly side 54$a$ carries out splitting and relative delay operations upon these receive signals. These operations define variable angles of electrical tilt for receive and receive polarisation diversity signals, which are subsequently combined on to the first feeder F21 and pass to the base station filter assembly 50. Similarly, using phase and length matched jumper cables once more, the negative polarisation pair of receive signals output from corporate feed ports A(−) and B(−) are fed to the right hand side 54$b$ of the antenna tilt assembly 54 for splitting and relative delay operations: here again these operations define variable angles of electrical tilt for receive and receive polarisation diversity signals, which are subsequently combined on to a second feeder F22 and pass to the base station filter assembly 50.

In the base station filter assembly 50, the combined receive signal from the first feeder F21 is filtered by a broad band receive filter 70$x$ and split by a splitter 72$x$. The splitter 72$x$ provides two receive signals for polarisation diversity purposes, these signals being amplified by low noise amplifiers (LNAs) 74$x$ and 76$x$ and filtered by narrow band filters 78$x$ and 80$x$ with different pass bands (frequencies RX1 and RX2) before passing respectively to first base station transmit/receive (TX1/RX1) port P21 and second base station polarisation diversity receive (RX2D) port P22D.

Similarly, the combined receive signal from the second feeder F22 is filtered by a broad band receive filter 70$y$ and split by means of a splitter 72$y$. This provides two split signals for polarisation diversity purposes: after output from the splitter 72$y$, the split signals are then amplified by LNAs 74$y$ and 76$y$ and filtered by narrow band filters 78$y$ and 80$y$ with different pass bands (frequencies RX1 and RX2) before passing respectively to second base station transmit/receive (TX2/RX2) port P22 and first base station polarisation diversity receive (RX1D) port P21D.

As will be described later in more detail, operation of the antenna tilt assembly 54 to vary delays applied to transmit and receive signals has the effect of varying the angle of electrical tilt of antenna beams of each polarisation independently. However, the delays are in this embodiment coupled in such a way as to provide for all signals associated with a single base station to have the same angle of electrical tilt: i.e. signals TX1, RX1 and RX1D associated with the first base station BS21 have the same angle of electrical tilt and signals TX2, RX2 and RX2D associated with the second base station BS22 have the same angle of electrical tilt. The angles of electrical tilt associated with the two base stations BS21 and BS22 may however differ, depending on how the delays in the antenna tilt assembly 54 are set.

Filtering specific to each base station's signals is provided by the base station filter assembly 50, which isolates first receive signal RX1 and first receive diversity signal RX1D for the first base station and second receive signal RX2 and second receive diversity signal RX2D for the second base station. Transmit signals TX1 and TX2 are radiated by separate antenna polarisations which are orthogonal, and in consequence the TX1 and TX2 filters for these signals may (optionally) be equivalent. The use of separate antenna polarisations for the transmit signals TX1 and TX2 of different base stations also means that the carrier frequencies of these signals may be contiguous without giving rise to undesirable intermodulation frequency products, because contiguous frequency signals are not combined in the circuitry illustrated but instead in air.

The antenna system 30 of the invention has a number of advantages:
(a) only two feeders are required for a dual polarisation antenna, and the feeders are not required to be matched in phase or electrical length;
(b) jumper leads which connect the antenna tilt assembly 54 to the corporate feeds 38(+) and 38(−) are short and can be phase or length matched without requiring calibration at installation or during operation; they may also be physically small in diameter because they are not the determining factor in overall loss between base stations BS21 and BS22 and antenna assembly 31;
(c) the number of signals passing between the antenna tilt assembly 54 and the corporate feeds 38(+) and 38(−) can be increased to provide an increased range of tilt;
(d) the antenna tilt assembly 54 can be incorporated either in part, or entirely, into the antenna assembly 31 to reduce overall visual impact; and
(e) combining of RF carriers having a contiguous frequency allocation is implemented without requiring either separate antennas or the use of 3 dB couplers which introduce 50% power loss.

FIG. 3 shows half 54a of the antenna tilt assembly 54 for use in the antenna system 30; i.e. the system 30 requires two instantiations (necessarily of like construction) of the half assembly 54a shown, one for each feeder/corporate feed combination F21/38(+) or F22/38(−), and these in combination provide the antenna tilt assembly 54. Description will initially be in terms of transmit mode operation of the half assembly 54a, first feeder F21 and positive polarisation corporate feed 38(+).

The first feeder F21 supplies to the half assembly 54a a transmit signal which is filtered by a transmit/receive duplex filter 100 and then split into two signals by a splitter 102. The two split transmit signals are delayed by respective transmit mode delays DTa and DTb of equal maximum value. As indicated by a dotted line 104 linking arrows, the delays DTa and DTb are variable and ganged (coupled) to vary together; in addition, an amplifier symbol (triangle) 106 in the dotted line 104 and marked −1 indicates that delay change implemented by left hand delay DTa is equal in magnitude and in the opposite sense to delay change implemented by right hand delay DTb: i.e. left hand delay DTa increases or reduces when right hand delay DTb reduces or increases, and vice versa. The two split transmit signals are therefore delayed both in absolute terms and also relative to one another by delays DTa and DTb, and the relative delay is variable by these ganged delays. The elements 102 to 106, DTa and DTb define a transmit tilt module TTM1 for the first base station's transmit frequency TX1.

After delay at DTa and DTb, the transmit signals are filtered by transmit/receive duplex filters 108 and 110, and then fed to the two ports A(+) and B(+) of the positive polarisation corporate feed 38(+) respectively for conversion into drive signals for each of the dipole antenna elements 34 disposed to have positive polarisation. These two ports A(+) and B(+) consequently receive respective transmit signals with the same frequency TX1 and variable relative delay between them: varying this relative delay by changing the ganged transmit mode delays DTa and DTb varies the angle of electrical tilt of the positive polarisation transmit mode antenna beam associated with dipoles 34 and frequency TX1.

The other half assembly 54b operates in the same way to convert a transmit signal at a second base station frequency TX2 on the second feeder F22 into two filtered and relatively delayed transmit signals which are fed to negative polarisation corporate feed ports A(−) and B(−) respectively to provide drive signals for negative polarisation dipole antenna elements 36. Varying the relative delay between these TX2 transmit signals varies the angle of electrical tilt of the negative polarisation transmit mode antenna beam associated with dipoles 36 and frequency TX2 of the second base station BS22.

The two half assemblies 54a and 54b both have transmit mode delays DTa and DTb, and the transmit mode delays of each half assembly 54a or 54b are variable independently of the like delays of the other half assembly 54b or 54a; consequently, the angles of electrical tilt of the positive and negative polarisation antenna beams associated with dipoles 34 and 36 and transmit frequencies TX1 and TX2 of first and second base stations BS21 and BS22 respectively are variable independently of one another.

The half assembly 54a operates in receive mode as follows. Signals received from free space by the positive polarisation dipole antenna elements 34 are converted by the positive polarisation corporate feed 38(+) into two receive signals: these receive signals appear at the two ports A(+) and B(+), after which they are filtered at transmit/receive duplex filters 108 and 110, amplified by LNAs 112 and 114 and split into two signals by first and second receive signal splitters 116 and 118 respectively.

The half assembly 54a has two pairs of receive mode delays for setting respective angles of tilt for the first receive frequency (RX1) and the second polarisation diversity receive frequency (RX2D): i.e. a first pair consists of first and second receive mode delays DRa and DRb, and a second pair consists of third and fourth receive mode delays DRc and DRd. This embodiment of the invention provides two independently adjustable angles of electrical tilt for receive (RX) signals, for which respective differential delays are inserted separately by the four receive mode delays DRa to DRd at frequencies RX1 and RX2 of two receive signals.

The output signals from the first and second receive signal splitters 116 and 118 are cross-connected so that each of these splitters provides signals to one delay in each of the pairs of receive mode delays. The two split signals from the first receive signal splitter 116 are therefore delayed by the first and third receive mode delays DRa and DRc respectively, and those from the second receive signal splitter 118 are delayed by the second and fourth receive mode delays DRb and DRd respectively. Consequently, the first pair of receive mode delays DRa and DRb receives two signals associated with different corporate feed ports, i.e. positive polarisation corporate feed ports A(+) and B(+) respectively, and so also does the second pair of receive mode delays DRc and DRd.

The two split signals from the first receive signal splitter 116 are delayed by first and third receive mode delays DRa and DRc respectively, and those from the second receive signal splitter 118 are delayed by second and fourth receive mode delays DRb and DRd respectively. As indicated by a dotted line 120 linking arrows, the first and second receive mode delays DRa and DRb are variable and ganged to vary together; in addition, an amplifier symbol 122 in the dotted line 120 and marked −1 indicates that delay change implemented by the first receive mode delay DRa is equal to and in the opposite sense to delay change implemented by the second receive mode delay DRb: i.e. the first receive mode delay DRa increases or reduces when the second receive mode delay DRb reduces or increases, and vice versa. The two split signals associated with the first pair of receive mode delays DRa and DRb and with different corporate feed ports A(+) and B(+) are therefore delayed both in absolute terms and relative to one another by those delays: the relative delay is variable by those ganged delays and controls the angle of electrical tilt of the positive polarisation antenna beam associated with the first receive frequency (RX1) and first base station BS21. In order to tilt a phased array antenna electrically, signal paths from a common point to different corporate feed ports A(+) and B(+) differ in path length: consequently only one delay is required to provide a phase difference for a given angle of tilt. In practice it is convenient to implement such a delay by means of one delay in one path and another delay in a second path.

Similarly, a dotted line 124 and an amplifier symbol 126 therein marked −1 indicate that the third receive mode delay DRc provides delay change equal to and in the opposite sense to that implemented by the fourth receive mode delay DRd. The two split signals associated with the second pair of receive mode delays DRc and DRd and with different corporate feed ports A(+) and B(+) of like polarisation are therefore delayed both in absolute terms and variably relative to one another by those delays. The relative delay is variable by those ganged delays and controls the angle of electrical tilt of the positive polarisation antenna beam associated with polarisation diversity and the second receive frequency (RX2D) and second base station BS22.

The two signals delayed by the first pair of receive mode delays DRa and DRb are combined together by a first signal combiner 128, and those delayed by the second pair of receive mode delays DRc and DRd are combined together by a second signal combiner 132. Combined signals output from the first and second signal combiners 128 and 132 are fed to uppermost inputs H1a, H2a of first and second quadrature hybrid couplers (hybrids) H1 and H2 respectively. The first hybrid H1 has a lowermost input H1b terminated in a matched load ML, and two outputs H1c and H1d connected to respective band pass filters HF1 and HF2 each with a pass band centred on the first receive frequency RX1. The second hybrid H2 has lateral inputs H2c and H2d connected to receive filtered signals from the band pass filters HF1 and HF2 respectively. It also has a lowermost output H2b connected to the transmit/receive duplex filter 100, which provides receive signal filtering and from which signals associated with different corporate feed ports A(+) and B(+) of like positive polarisation pass to the first feeder F21. Operation of the hybrids H1 and H2 will be described in more detail later. The elements 116 to 132, DRa to DRd, H1, H2 HF1 and HF2 define a receive tilt module RTM1 for the first base station's receive frequency RX1 and the second base station's receive diversity signal frequency RX2D.

The other half assembly 54b operates similarly upon negative polarisation signals: i.e. signals received from free space by negative polarisation dipole antenna elements 36 are converted by the negative polarisation corporate feed 38(−) into two receive signals appearing at ports A(−) and B(−) respectively. These receive signals become converted by half assembly 54b into delayed, combined and filtered signals associated with negative polarisation corporate feed ports A(−) and B(−), and such signals pass to the second feeder F22. As previously described in connection with positive polarisation antenna beams and half assembly 54a, adjustment of ganged pairs of receive mode delays DRa, DRb and DRc, DRd in half assembly 54b provides control of angles of electrical tilt of negative polarisation antenna beams independently: these beams comprise a beam associated with the second receive frequency (RX2) and second base station BS22 and another beam associated with polarisation diversity and the first receive frequency (RX1D) and first base station BS21. To amend FIG. 3 appropriately for half assembly 54b, A(+) and B(+) at the top should be A(−) and B(−), and the expressions "Set TX1 Tilt", "Set RX1 Tilt" and "Set RX2D Tilt" should be replaced by "Set TX2 Tilt", "Set RX2 Tilt" and "Set RX1D Tilt" respectively.

Operation of the hybrids H1 and H2 in half assembly 54a will now be described in more detail: these hybrids and their associated band pass filters HF1 and HF2 are used to combine signals output from the first and second signal combiners 128 and 132 in a frequency selective manner to preserve properties giving rise to different angles of electrical tilt. Pairs of adjacent ports of each of the hybrids H1 and H2 are marked with intervening numerals 0 and 90 indicating the phase shift in degrees which a signal experiences in passing between ports in such a pair relative to that experienced between a pair of ports with intervening numeral 0.

The signals delayed by the first pair of receive mode delays DRa and DRb are combined by the first signal combiner 128: the resulting combined signal is applied to the uppermost input H1a of the first hybrid H1, which splits it into two output signals appearing at outputs H1c and H1d with −90 degree phase shift and 0 phase shift respectively. These two output signals are filtered by the band pass filters HF1 and HF2, which impose equal bandwidth and time delays and applied to second hybrid lateral inputs H2c and H2d respectively. The signal at input H2c undergoes −90 degree phase shift in passing to input H2a and 0 phase shift in passing to output H2b; the signal at input H2d undergoes 0 phase shift in passing to input H2a and phase shift −90 degree in passing to output H2b; These signals are therefore 180 degrees out of phase and cancel one another out (subtract) at input H2a but are in phase and add together at output H2b.

Signals delayed by the second pair of receive mode delays DRc and DRd are combined by the second signal combiner 132: this combined signal is applied to the uppermost input H2a of the second hybrid H2, which splits it into two output signals appearing at inputs H2c and H2d with −90 degree phase shift and 0 phase shift respectively. These two output signals are outside of the pass band of the band pass filters HF1 and HF2; consequently they are reflected back into inputs H2c and H2d respectively, and they cancel one another out at input H2a but add together at output H2b as previously described for signals from the first hybrid H1 filtered at HF1 and HF2 to which they are added. Consequently the second hybrid H2 acts as a combiner of signals delayed at DRa to DRd, and the signals so combined pass from the second hybrid output H2b to the TX/RX duplex filter 100 for filtering and connection to the first feeder F21.

FIG. 4 is a graph of amplitude against frequency for FIG. 3 circuitry including hybrids H1 and H2 and filters HF1 and HF2. The filters HF1 and HF2 define a narrow pass band which passes only frequencies in a range f3 to f4 to second hybrid inputs H2c and H2d, while frequencies f1 to f2 and f5 to f6 can pass to second hybrid input H2a. Overall band width f1 to f6 is determined by the frequency characteristics of the hybrids H1 and H2, while f2 to f3 and f4 to f5 act as guard bands; guard bands are unused frequency intervals which accommodate filter roll-off, i.e. non-infinite stop-band attenuation characteristics of practically achievable filters.

The centre frequency and bandwidth of the filters HF1 and HF2 are chosen to pass receive signals with the frequency RX1 of the first base station BS21. The receive signal frequency RX2 of the second base station BS22 may then be located anywhere within the overall bandwidth of the hybrids f1 to f6 with the exclusion of the guard bands and filter pass band collectively f2 to f5; i.e. RX2 may be in f1 to f2 or f5 to f6.

The band pass filters HF1 and HF2 may be replaced by band stop filters, in which case the first hybrid H1 now receives a wide band input and the second hybrid H2 a narrow band input. The choice of band pass or band stop filters has regard to relative size and cost of filters for a particular band centre frequency.

FIG. 5 shows an antenna system 150 which is generally of the form described with reference to FIGS. 2 and 3, and parts equivalent to those described earlier are like referenced. The antenna system 150 incorporates an antenna assembly 31 and a base station filter assembly 50 located in the vicinity of two base stations BS1 and BS2 (e.g. at the foot of an antenna mast (not shown) on which the antenna assembly 31 is mounted). It also incorporates an antenna tilt assembly 54 mounted either at an antenna mast head in proximity to the antenna assembly 31 as illustrated or alternatively within the antenna assembly 31 itself.

The antenna assembly 31 incorporates a dual polarised antenna 32 with vertically arranged orthogonal dipoles 34 and 36 connected to the antenna tilt assembly 54 via positive and negative polarisation corporate feeds 38(+) and 38(−) respectively. Being dual polarised, the antenna 32 generates two antenna beams which are polarised orthogonally to one another, i.e. a respective beam for each of the two antenna polarisations. Each antenna beam has a respective angle of electrical tilt controlled by the phase difference or phase differences between two or more input signals to its associated corporate feed 38(+) or 38(−). Antennas with an angle of electrical tilt controlled by the phase difference between two corporate feed input signals are known from published international application no. WO 2004/102739, 25th Nov. 2004. It can also be shown that an antenna's angle of electrical tilt may be controlled over an increased range of tilt by phase differences between three or more corporate feed input signals, i.e. as indicated by dotted lines 152, one or more additional corporate feed input signals compared to those of FIG. 2.

Dipoles 34 of the antenna 32 produce positive polarisation upper and lower beams 154 and 156 with respective centres 154c and 156c shown dotted. Upper beam 154 carries the transmit signal TX1 and receive signal RX1 for the first base station BS21. Lower beam 156 carries the polarisation diversity signal RX2D for the second base station BS22. Similarly, dipoles 36 of the antenna 32 produce negative polarisation upper and lower beams 164 and 166 with centres 164c and 166c. Lower beam 164 carries the transmit signal TX2 and receive signal RX2 for the second base station BS22. Upper beam 166 carries the polarisation diversity signal RX1D for the first base station BS21.

As described with reference to FIG. 3, angles of tilt of transmit signals TX1 and TX2, receive signals RX1 and RX2 and receive polarisation diversity signals RX1D and RX2D are all independently adjustable by set tilt angle controls indicated collectively at 54x in FIG. 5. This enables the antenna system 150 to provide independently adjustable tilt for the two antenna polarisations. In practice, a base station may require its beams to have like angles of tilt: as illustrated in FIG. 5 therefore, beams 156 and 166 providing transmit and receive signals TX1, RX1 and polarisation diversity signal RX1D associated with the first base station BS21 are adjusted to have the same angle of electrical tilt by means of the set tilt controls illustrated in FIG. 3; likewise, the same angle of electrical tilt is arranged for beams 154 and 164 providing polarisation diversity signal RX2D and transmit and receive signals TX2, RX2 associated with the second base station BS22.

A feature of FIGS. 2 and 5 is that transmit signals TX1 and TX2 from the first and second base stations BS21 and BS22 pass through different circuit elements and are radiated from different antenna dipoles (i.e. different antenna polarisations). Consequently, these high power transmit signals are not combined in the circuitry of the antenna system 30 or 150 the transmit carriers; instead they are combined in free space ("air combined") after radiation from the antenna 32 without generating unwanted intermodulation products (IMPs) and without incurring power losses in components such as 3 dB couplers used for transmit signal combining to avoid generating IMPs.

The antenna system 150 may optionally incorporate additional base stations as indicated by an Nth base station BS[N] shown dotted. Additional filters are required. If the extra base station(s) involve(s) two base stations having contiguous transmit signal frequencies, they are preferably to be connected to different antenna polarisations to reduce combining losses which would otherwise arise due to the need to incorporate a hybrid combiner giving 3 dB power loss. Here contiguous frequencies are those which cannot be adequately separated using conventional filters. Signal combining is disclosed in published international application no. WO 02/082581, and U.S. Pat. Nos. 4,211,894 and 5,229,729.

FIG. 6 shows an alternative form 154a of half 54a of the antenna tilt assembly 54 for use in the antenna system 30 or 150. It is identical to that described with reference to FIG. 3, except that all elements after the first and second signal combiners 128 and 132 up to but not including transmit/receive duplex filter 100 are omitted and replaced by a combiner circuit 160 indicated by chain lines. Parts equivalent to those described earlier are like-referenced.

The combiner circuit 160 receives combined signals output from the first and second signal combiners 128 and 132, and these signals are fed to respective RF mixers M1 and M2 for downward frequency translation by mixing with signals from respective local oscillators Flo1 and Flo2. Consequently receive signal RX1 is mixed at M1 and receive polarisation diversity signal RX2D is mixed at M2: mixing is at slightly different frequencies so that difference frequency signals produced by the two mixers M1 and M2 are at the same frequency. This provides mixer output signals with the same frequency sufficiently low for filtering with band pass filters implemented using piezo-electrical crystal technology. The mixer output signals are filtered by respective band pass filters Fpe1 and Fpe2 each with a pass band centre frequency F1, and then upward frequency translated to their former RF frequencies by mixing with the same local oscillator signals as before in respective further RF mixers M3 and M4: these further mixers M3 and M4 provide output signals which are combined by a signal combiner 162 and their combination is fed to the transmit/receive duplex filter 100 as in the half assembly 54a for filtering and output to the first feeder F21. This feeder therefore carries associated TX and RX signals. Elements 116 to 162 in FIG. 6 define a receive channels tilt module RTM6. The band pass filters Fpe1 and Fpe2 are physically smaller and lighter in weight than the filters HF1 and HF2, which are cavity band pass filters.

Referring now also to FIG. 7, the operation of the combiner circuit 160 is illustrated graphically. In upper graph 170, receive signal RX1 and receive polarisation diversity signal RX2D have bandwidths illustrated by dotted lines as arrowed, and the transmit/receive duplex filter 100 has a pass band (solid line) PB covering both of these. Dotted lines GA to GD indicate filter frequency characteristics. As shown on central graph 172, downward frequency translation converts both of these receive signals to the frequency F1 of the band pass filters Fpe1 and Fpe2, which is in the range 50 MHz to 400 MHz. F1 is high enough to avoid unwanted receive frequencies folding-back into these filters' pass band, and low enough to be implemented with conventional crystal filters, ceramic or passive technology. The filters Fpe1 and Fpe2 have a bandwidth indicated between arrows GL and GM centred at GL (or F1), and this is sufficiently wide to pass the bandwidth of a single receive signal, i.e. RX1 or RX2D. Graph 174 illustrates upward frequency translation, which restores the original RF frequencies of receive signal RX1 and receive polarisation diversity signal RX2D.

FIG. 8 shows a further alternative form 254a of half 54a of the antenna tilt assembly 54 for use in the antenna system 30 or 150. Parts equivalent to those described earlier are like-referenced. The half assembly 254a differs compared to earlier embodiments in that only one of the corporate feed connections (that to B(+)) is associated with delays—the other (A(+)) is not. This is because, in order to vary electrical tilt angle, there must be a variable delay (or equivalently phase shift) between signals passing to or from corporate feed connections A(+) and B(+), but that delay may be implemented in series with one of these connections only (i.e. instead of both) and still result in variable relative delay between signals passing to or from connections A(+) and B(+).

The half assembly 254a is identical to that described with reference to FIG. 3 as regards circuit elements and processing for transmit signals, and also as regards the like for receive signals up to the outputs of LNAs 112 and 114, after which circuitry and processing differ compared to that described earlier. Signals output from LNAs 112 and 114 pass as inputs to a signal combiner 200 and to a receive channels tilt controller 202 respectively. The signal combiner 200 receives as a second input an output signal from the tilt controller 202, and it adds its two input signals to provide a combined receive signal for input to the transmit/receive duplex filter 100 for filtering and output to the first feeder F21 as in the half assembly 54a.

The signal output from LNA 114 and input to the receive channels tilt controller 202 is split into two signals by a splitter 204. These split signals are fed to respective RF mixers M11 and M12 for downward frequency translation by mixing with signals from respective local oscillator (LO) frequency synthesisers Flo11 and Flo12, which generate LO signals under the control of a common reference oscillator OR. Consequently receive signal RX1 is mixed at M11 and receive polarisation diversity signal RX2D is mixed at M12: mixing is at slightly different frequencies so that difference frequency signals (i.e. mixer output signals) produced by the two mixers M11 and M12 are at the same frequency. The mixer output signals are filtered by respective band pass filters Fpe11 and Fpe12 each with a pass band centre frequency F11, and then upward frequency translated to their former RF frequencies by mixing with the same LO signals as before in respective further RF mixers M13 and M14.

The LO signal employed by mixer M13 is delayed (or phase shifted) relative to the reference oscillator signal by a first variable delay DRX1, and the LO signal employed by mixer M14 is delayed relative to the reference oscillator signal by a second variable delay DRX2. The further mixers M13 and M14 provide upward frequency translated output signals which are combined by a signal combiner 206; the combination of these output signals generated by the signal combiner 206 provides the output signal from the tilt controller 202, which as aforesaid is combined by the signal combiner 200 with the signal output from LNA 112 and fed to the transmit/receive duplex filter 100 for filtering and output to the first feeder F21.

Operation of the first and second variable delays DRX1 and DRX2 (as indicated by legends "Set RX1 Tilt" and "Set RX2D Tilt" at 203a and 203b) applies independent variable delays to the RX1 and RX2 signals derived via corporate feed connection B(+), LNA 114 and receive channels tilt controller 202 compared to RX1 and RX2 signals derived via LNA 112 and corporate feed connection A(+). As previously discussed, the phase difference or relative time delay between signals associated with two ports A(+), B(+) of corporate feed 38(+) controls the angle of electrical tilt of the antenna polarisation associated with antenna elements (dipoles 34) connected to that corporate feed. Consequently, operation of the first and second variable delays DRX1 and DRX2 controls independently the angles of electrical tilt associated with receive signals RX1 and RX2D.

The half assembly 254a may be modified by replacing the frequency synthesis and time delay components by a Direct Digital Synthesiser (DDS) having two outputs, one output having a controlled phase offset with respect to the other.

As has been said, the invention may be used with corporate feeds providing control of angle of electrical tilt in response to relative delay of two or more signals. Referring now to FIG. 9, an antenna system 300 is shown which is arranged for control of angle of electrical tilt using three signals two of which are variably delayed with respect to the third. The system 300 incorporates phase padding components (not shown) to equalize the phase shifts experienced by signals passing through it.

The system 300 incorporates an electrical tilt controller 362 and a corporate feed 364, the latter connected to a phased array antenna 366 with eleven antenna elements: these elements are a central antenna element Ec, five upper antenna elements E1U to E5U and lower five antenna elements E1L to E5L.

An input signal represented as a vector V is applied to an input 368 of the tilt controller 362, in which it is split into two signal vectors $c_1.V$ and $c_2.V$ of differing amplitude by a first splitter S1 providing voltage split ratios $c_1$ and $c_2$. The signal vector $c_2.V$ is now designated as a tilt vector C, and appears at a controller output 362c.

The signal vector $c_1.V$ is further split by a second splitter S2 to provide first and second signal vectors $c_1.d_1.V$ and $c_1.d_2.V$: the first signal vector $c_1.d_1.V$ is delayed by a first variable delay T1 to give a signal vector which is now designated as a tilt vector A and appears at a controller output 362a; similarly, the second signal vector c1.d2.V is delayed by a second variable delay T2 to give a signal vector now designated as a tilt vector B and appearing at a controller output 362b. It is a feature of this embodiment of the invention that it uses only two variable delays T1 and T2 and three tilt vectors, later embodiments using more of each.

Tilt controller 362 consequently provides three antenna tilt control signals, these signals representing tilt vectors A=c1.d1.V[T1], B=c1.d2.V[T2] and C=c2.V, where [T1], [T2] indicate variable delay T1, T2 respectively. Delays T1 and T2 are ganged as denoted by a dotted line 370, which contains a −1 amplifier symbol 372 indicating that T1 increases from 0 to T when T2 reduces from T to 0 and vice versa: here T is a prearranged maximum value of delay for both of the ganged variable delays T1 and T2. Operation of a delay control 374 varies both of the ganged variable delays T1 and T2 in combination, and changes their respective delays by amounts which are equal in magnitude and opposite in sign, one being an increase and the other a reduction: in response to these variable delay changes, the angle of electrical tilt of the antenna array 366 also changes.

A third splitter S3 with voltage split ratios e1 and e2 splits tilt vector C into signals e1.C and e2.C, or equivalently c1.e1.V and c2.e1.V: signal e1.C is designated Cc (C central) and fed as a drive signal to the central antenna element Ec (an antenna element drive signal results in radiation of that signal from the antenna element into free space). Signal e2.C is further split by a fourth splitter S4 with voltage split ratios f1 and f2; this produces a signal c2.e2.f1.V designated Cu (C upper), and also a signal c2.e2.f2.V designated Cl (C lower).

The vectors A and Cu are used to provide drive signals to antenna elements E1U to E5L connected to the upper part of the corporate feed 364. Fifth and sixth splitters S5 and S6 with voltage split ratios a1, a2 and g1, g2 respectively split tilt vector A into signals a1.A and a2.A, and tilt vector Cu into signals g1.Cu and g2.Cu.

Similarly, the vectors B and Cl are used to provide drive signals to antenna elements E1L to E5L connected to the lower part of the corporate feed 364. Seventh and eighth splitters S7 and S8 with voltage split ratios b1, b2 and Ha, Hb respectively split tilt vector B into signals b1.B and b2.B, and tilt vector Cl into signals Ha.Cl and Hb.Cl.

A ninth splitter S9 with voltage split ratios i1 and i2 splits signal a2.A from fifth splitter S5 into signals i1.a2.A and i2.a2.A, of which signal i1.a2.A is connected to and provides a drive signal for third upper antenna element E3U. A tenth splitter S10 with voltage split ratios j1 and j2 splits signal b2.B from seventh splitter S7 into signals j1.b2.B and j2.b2.B, of which signal j1.b2.B is connected to and provides a drive signal for third lower antenna element E3L.

The corporate feed 364 incorporates six vector combining devices Ha to Hf, each of which is a 180 degree hybrid (sum and difference hybrid) having two input terminals designated 1 and 3 and two output terminals designated 2 and 4. Signals pass from each input to both outputs: a relative phase change of 180 degrees appears between signals passing between one input-output pair as compared to the other: as indicated by the location of a character 7 on each hybrid, this occurs between input 1 and output 4 in hybrids Ha and Hb, and between input 3 and output 4 in hybrids Hc to Hf. Each of the hybrids Ha to Hf produces two output signals which are the vector sum and difference of its input signals.

The first hybrid Ha receives input signals a1.A from fifth splitter S5 and g2.Cu from sixth splitter S6: it adds and subtracts these signals to provide their difference as input to the third hybrid Hc and their sum as input to the fifth hybrid He. Similarly, the second hybrid Hb receives input signals b1.B from seventh splitter S7 and h2.Cl from eighth splitter S8: it provides these signals' difference as input to the fourth hybrid Hd and their sum as input to the sixth hybrid Hf.

The third hybrid Hc receives another input signal i2.a2.A from ninth splitter S9 in addition to that from first hybrid Ha, and produces sum and difference signals for output as drive signals to fourth and fifth upper antenna elements E4U and E5U respectively.

The fifth hybrid He receives another input signal g1.Cu from sixth splitter S6 in addition to that from first hybrid Ha, and produces sum and difference signals for output as drive signals to first and second upper antenna elements E1U and E2U respectively.

The fourth hybrid Hd receives another input signal j2.b2.B from seventh splitter S7 in addition to that from second hybrid Hb, and produces sum and difference signals for output as drive signals to fourth and fifth lower antenna elements E4L and E5L respectively.

The sixth hybrid Hf receives another input signal h1.Cl from eighth splitter S8 in addition to that from second hybrid Hb, and produces sum and difference signals for output as drive signals to first and second lower antenna elements E1L and E2L respectively.

First, third and fifth hybrids Ha, Hc and He implement vector combination processes to generate signals for antenna elements E1U, E2U, E4U and E5U, and second, fourth and sixth hybrids Hb, Hd and Hf implement the like for antenna elements E1L, E2L, E4L and E5L. Signals for antenna elements Ec, E3U and E3L are generated by splitters without hybrids.

If additional splitting and variable delay is incorporated in the electrical tilt controller 362, and additional signal splitting and combining in the corporate feed 364, four or more tilt vectors A, B, C, . . . etc. may be employed for control of angle of electrical tilt, all but one of these tilt vectors being variably delayed with respect to the other tilt vector.

FIG. 10 shows a half assembly 454a suitable for implementing half of the antenna tilt assembly 54 in FIG. 5 when adapted to employ three signals per corporate feed 38(+) or 38(−) equivalent to signal vectors A, B and C in FIG. 9. The half assembly 454a is identical to that described with reference to FIG. 3 with components added to accommodate a third corporate feed port C(+): parts equivalent to those described earlier are like referenced and description will concentrate on aspects of difference.

The transmit signal leaving the transmit/receive duplex filter 100 is split by a splitter 402 before reaching the transmit channel tilt control circuitry comprising splitter 102 and ganged delays data and DTb. The splitter 402 splits off a proportion of the transmit signal, which is filtered by an additional transmit/receive duplex filter 404 and passes to the third corporate feed port C(+). This proportion of the transmit signal does not pass via any delay unit within the half assembly 454a, but the other proportions of the transmit signal produced by splitter 102 are variably delayed relative to it at DTa and DTb. Consequently, the corporate feed ports A(+), B(+) and C(+) receive respective transmit signal proportions two of which are variably delayed relative to the third, as required to control the transmit mode angle of electrical tilt in an antenna system incorporating the corporate feed 364 illustrated in FIG. 9.

A receive signal returns from the positive polarisation dipoles 34 via the third corporate feed port C(+), and is filtered at 404 before passing to an additional LNA 406. After amplification at 406, this receive signal is combined with the output signal from the second hybrid H2 by an additional signal combiner 408. The resulting receive signal combined at 408 passes to the transmit/receive duplex filter 100 for filtering and then onward to the first feeder F21. This resulting receive signal contains one contribution from the third corporate feed port C(+) which has not passed via any delay unit within the half assembly 454a. It also contains contributions from the first and second corporate feed ports A(+) and B(+) which are variably delayed at DRa, DRb and DRc, DRd relative to that from the third corporate feed port C(+). Consequently, the first feeder F21 receives a combined receive signal containing contributions from all three corporate feed ports A(+), B(+) and C(+) two of which are variably delayed relative to the third, as required to control the receive mode angle of electrical tilt in an antenna system incorporating the corporate feed 364 illustrated in FIG. 9.

FIG. 11 shows another half assembly 554a suitable for implementing half of the antenna tilt assembly 54 in FIG. 5 when adapted to employ three signals per corporate feed 38(+) or 38(−). It is equivalent to FIG. 6 modified in the same way as FIG. 3 was modified to produce FIG. 10, and parts equivalent to those described earlier are like referenced. A dotted rectangle 500 represents elements 116 to 162 in FIG. 6 defining the receive channels tilt module RTM6. The half assembly 554a accommodates three corporate feed ports A(+), B(+) and C(+) in the same way as that described with reference to FIG. 10.

The examples of the invention hereinbefore described are suitable for use with transmit frequencies which are separable by conventional filtering or which are to be radiated from different dipoles which are mutually orthogonally polarised (e.g. dipoles 34 and 36). This implies that the transmit frequencies are non-contiguous where they are to be separated by filters and radiated from the same dipoles: here "non-contiguous" means that there are spaces between adjacent transmit frequency bands.

FIG. 12 illustrates the meanings of the expressions "contiguous" and "non-contiguous" in relation to frequencies and frequency bands: "non-contiguous" is used to indicate transmit frequencies or frequency bands which can be separated adequately by conventional filters, and "contiguous" those which cannot.

Five contiguous frequency bands 600, 602, 604, 606 and 608 are indicated by respective pairs of adjacent vertical chain lines which delimit them. This corresponds to the Third Generation Frequency Division Duplex (3G FDD) frequency bands allocated in the United Kingdom. The total spectrum allocation for five operating frequencies consists of a band 2110.3 MHz to 2169.7 MHz for FDD transmission from base-stations, and a band 1920.3 MHz to 1979.7 MHz for transmission from mobile radios. Conventional filters to separate operating frequencies in these bands would require pass bands 610 to 618 respectively. Here for clarity pass-bands 612 and 616 are indicated by chain lines and have been displaced downwards slightly relative to pass-bands 610, 614 and 618. This drawing illustrates the fact that filters are not perfect, i.e. they cannot have pass-bands with accurately located, infinitely sharp cut-on and cut-off. Adjacent pairs of pass-bands such as 610 and 612 overlap seriously because of finite slope of filter characteristics: this gives rise to two deleterious effects, increased signal loss in the overlap region and reduced isolation between signals. The reason for the increased signal loss and reduced isolation is associated with the use of feeders carrying a combination of signals. In order to combine signals efficiently, the electrical impedance across each filter pass-band 610 to 618 must be maintained at some nominal value, e.g. 50 ohms. When pass-bands overlap as shown in FIG. 9, this nominal impedance cannot be maintained: this results in (a) loss in signal coupling to a feeder and distortion of signal waveform, (b) a proportion of each signal coupling into adjacent filters and hence into other base stations and their transmitters. The output stage of a transmitter is non-linear, and coupling of a signal with a different frequency to it results in inter-modulation products (IMPs) being generated in because this stage. IMPs become uncontrolled spurious emissions which, if large enough, can exceed the level permitted by the regulatory authorities which oversee communications of this kind.

Referring now to FIG. 13, another antenna system 700 of the invention incorporates four base stations, i.e. first, second, third and fourth base stations BS71, BS72, BS73 and BS74 operating at contiguous frequencies. The base stations BS71 to BS74 have respective transmit frequency bands located relative to one another as shown at 610, 612, 614 and 616 in FIG. 12, and their receive frequency bands are similarly contiguous. Consequently, the second base station's operating frequencies are contiguous with those of the first and third base stations BS71 and BS73, and the third base station's operating frequencies are contiguous with those of the second and fourth base stations BS72 and BS74; however, the first and third base stations BS71 and BS73 have operating frequencies which are not contiguous with one another, and this also applies to the second and fourth base stations BS72 and BS74. This is also indicated by the grouping of odd-numbered or first and third base stations BS71 and BS73 as a left hand pair associated with a first feeder F71 in FIG. 13, and even-numbered or second and fourth base stations BS72 and BS74 as a right hand pair associated with a second feeder F72.

The base stations BS71 to BS74 share an antenna assembly 702 with a dual polarised phased array antenna 704. The antenna 704 has an angle of electrical tilt set by corporate feed input signal phase difference as described earlier: it is a single antenna comprising a vertical array of antenna elements in the form of crossed dipoles D1 and D2 with mutually orthogonal polarisations at +45 and −45 degrees to the vertical and slanting upwards to the right (positive (+) polarisation) and upwards to the left (negative (−) polarisation) respectively. Positive polarisation dipoles D1 are connected to a positive polarisation corporate feed D1(+) and negative polarisation dipoles D2 are connected to a negative polarisation corporate feed D2(−). The corporate feeds D1(+) and D2(−) have two input/output ports A(+), B(+) and A(−), B(−). Each of the corporate feeds D1(+) and D2(−) is of the kind previously described which converts two input signals into drive signals for antenna elements D1 or D2, and the phase difference between these input signals controls the angle of electrical tilt of the antenna polarisation (+) or (−) associated with those elements.

Each of the four base stations BS71 to BS74 has two ports one of which is a polarisation diversity port suffixed D; i.e. the first, second, third and fourth base stations BS71, BS72, BS73 and BS74 each have two ports P71 and P71D, P72 and P72D, P73 and P73D, and P74 and P74D respectively, of which ports suffixed "D" are for polarisation diversity receive signals. The base stations BS71 to BS74 supply transmit signals to and accept receive signals from the antenna 704 via a base station filter assembly 706 and an antenna tilt assembly 708 connected by first and second feeders F71 and F72.

Transmit signals from the first and third base stations BS71 and BS73 pass to the antenna tilt assembly 708 as inputs to respective transmit/receive duplex filters DF1 and DF3 which separate transmit and receive signal paths. After filtering at DF1 and DF3, these signals are input to respective transmit band pass filters TX1 and TX3 in a combining transmit/ receive duplex filter CBF1, which combines them on to the first feeder F71 for routing to the base station filter assembly 706. In the base station filter assembly 706, the combined signal TX1/TX3 is input to a transmit/receive duplex filter DF(+), which separates transmit and receive signal paths and is associated with the positive polarisation corporate feed D1(+). After filtering at DF(+), the combined signal TX1/TX3 is split at S(+) into two signals which are fed to respective transmit tilt modules TM1 and TM3 each of which is shown as TTM1 in FIG. 3 and described with reference to half assembly 54a. Each transmit tilt module TM1 or TM3 provides two variably and relatively delayed signals which are fed to combining transmit/receive duplex filters CFA(+) and CFB(+) associated with positive polarisation corporate feed ports A(+) and B(+) respectively. The duplex filters CFA(+) and CFB(+) each have separate band pass filters for the transmit signal frequencies TX1 and TX3, and they each combine transmit signals with these frequencies for input to positive polarisation corporate feed ports A(+) and B(+) respectively. First base station transmit signals with frequency TX1 and relatively delayed with respect to one another consequently enter respective positive polarisation corporate feed ports A(+) and B(+); likewise, these feed ports also receive input of relatively delayed versions of third base station transmit signals with frequency TX3. Moreover, the relative delay between transmit signals with frequency TX1 is controllable independently of that between transmit signals with frequency TX3, because they are controlled separately by transmit tilt modules TM1 and TM3. Consequently, the tilt modules TM1 and TM3 provide independent control of the angles of electrical tilt of transmit signals of the first and third base stations BS71 and BS73 radiated from the positive polarisation dipoles D1.

Signals received from free space by the positive polarisation dipoles D1 are processed into two receive signals by the positive polarisation corporate feed D1(+): these two signals pass out of the ports A(+) and B(+) and thence to the combining transmit/receive duplex filters CFA(+) and CFB(+) respectively for filtering. After filtering at CFA(+) and CFB(+), the receive signals pass to a receive tilt module RM13, which is shown as RTM1 in FIG. 3 and described with reference to half assembly 54a. As previously described, the receive tilt module RM13 provides independent variable delays (and therefore independently adjustable tilt angles) for the first base station receive signal RX1 and the second base station polarisation diversity receive signal RX2D. These delays are however shared by the third and fourth base stations BS73 and BS74; i.e. the receive tilt module RM13 provides a variable delay and tilt angle for the third base station receive signal RX3 equal to that of the first base station receive signal RX1, and a variable delay and tilt angle for the fourth base station polarisation diversity receive signal RX4D equal to that of the second base station polarisation diversity receive signal RX2D.

The receive tilt module RM13 provides a combined receive signal output which incorporates appropriate delays and which is filtered at transmit/receive duplex filter DF(+): this filter combines transmit and receive signal paths at the first feeder F71, after which the combined receive signal is separated from transmit signals by the transmit/receive duplex filter CBF1, amplified at 720 and split into four signals at 722. Two of the four split signals are filtered at duplex filters DF1 and DF3 and fed to the transmit/receive ports P71 and P73 of the first and third base stations BS71 and BS73 respectively. The other two of the four split signals are fed to the polarisation diversity receive ports P72D and P74D of the second and fourth base stations BS72 and BS74 respectively.

Apparatus elements on the left hand side of FIG. 13 consequently provide independently controllable angles of electrical tilt for:
 the transmit signals TX1 and TX3 for the first and third base stations BS71 and BS73,
 the receive signal RX1 for the first base station base station BS71 (shared with RX3—that of the third base station BS73); and
 the polarisation diversity receive signal RX2D for the second base station (shared with RX4D—that of the fourth base station BS74).

FIG. 13 is symmetrical with respect to reflection in a line extending through the mid-points of the dipoles D1 and D2: the right hand side of FIG. 13 operates equivalently to the left hand side described above and will not be described. By symmetry, apparatus elements on the right hand side of FIG. 13 provide independently controllable angles of electrical tilt for:
 the transmit signals TX2 and TX2 for the second and fourth base stations BS72 and BS74,
 the receive signal RX2 for the second station BS72 (shared with RX4—that of the fourth base station BS74); and
 the polarisation diversity receive signal RX1D for the first base station (shared with RX3D—that of the third base station BS74).

The antenna system 700 therefore provides independently controllable angles of electrical tilt in transmit mode for four different base stations with contiguous frequencies, and sharing of independently controllable angles of electrical tilt in receive mode between pairs of base stations. The four base stations with contiguous frequencies are in effect separated into two pairs of base stations with non-contiguous frequencies, the pairs being the first and third base stations BS71 and BS73 and the second and fourth base stations BS72 and BS74. Signals transmitted or received by the first and third base stations BS71 and BS73 are associated with the positive polarisation corporate feed D1(+), and signals transmitted or received by the second and fourth base stations BS72 and BS74 are associated with the negative polarisation corporate feed D2(−). In consequence, signals with contiguous frequencies are not combined in antenna system circuitry and are isolated from one another by the isolation between orthogonal dipoles D1 and D2: this applies to signals associated with first and second base stations 8571 and BS72, or second and third base stations BS72 and BS73, or third and fourth base stations BS73 and BS74.

If required, independently controllable angles of electrical tilt may be provided for all four receive signal frequencies by a simple modification to FIG. 13: tilt modules RM13 and RM24 may be replicated to provide a total of four such modules in the same way as there are four transmit modules. Receive signal outputs of duplex filters CFA(+), CFB(+), CFA(−) and CFB(−) are split into two to provide input to the four receive modules, and signal combiners combine pairs of receive module outputs for filtering at duplex filters DF(+) and DF(−) before passing to feeders F71 and F72. Additional low noise amplifiers may also be inserted (compare earlier embodiments of the invention).

It is to be noted that it is not required to phase match feeders F71 and F72, which carry high power and extend over a long distance up an antenna mast. Phase matching is required between jumper leads connecting the antenna tilt assembly 708 to the corporate feeds D1(+) and D2(−), but this presents little difficulty as they are short and inaccuracies due to temperature drift etc. are much less significant.

Referring now to FIG. 14, another antenna system 800 of the invention is shown which is the system 700 described with reference to FIG. 13 adapted to implement modifications C(+), C(−), 402, 404 and 408 shown in FIG. 10 to make it suitable for three signal control of angle of electrical tilt. These modifications are made to an antenna tilt assembly ATA(+) associated with a positive polarisation corporate feed CF(+), and a further antenna tilt assembly ATA(−) of like construction is associated with a negative polarisation corporate feed CF(−). The antenna system 800 has components and operates substantially as described with reference to FIGS. 10 and 13, and will not be described further.

The embodiments of the invention described with reference to FIGS. 2 to 14 show that two or four base stations may share a single phased array antenna that tilts in response to the phase difference between two or three antenna corporate feed signals per polarisation while retaining an independently adjustable angle of electrical tilt for transmit and receive signals. The range of tilt angle control is extended by the use of additional corporate feed signals, i.e. three instead of two.

The invention claimed is:

1. An antenna system including:
   a) a dual polarised antenna with electrical tilt adjustable polarisations;
   b) a respective corporate feed means for relaying intermediate signals between each antenna polarisation and delaying means, each corporate feed means being arranged to provide for the electrical tilt of the associated antenna polarisation to be adjustable in response to relative delay of a plurality of intermediate signals and the delaying means providing for intermediate signals to be subject to relative delays;
   c) a respective signal feeder associated with each antenna polarisation; and
   d) two stations each for at least one of receiving and transmitting signals via the antenna polarisations and signal feeders, the antenna system being arranged such that each antenna polarisation is associated with a signal of one respective station and with a polarisation diversity signal of the other respective station.

2. An antenna system according to claim 1 wherein the two stations have contiguous operating frequencies.

3. An antenna system according to claim 1 wherein at least one station is at least for transmitting signals and the delaying means comprises means for processing the at least one station's transmit signal into two intermediate signals with relative delay therebetween.

4. An antenna system according to claim 1 wherein the stations are at least for receiving signals and the delaying means comprises means for processing a respective plurality of intermediate signals from each corporate feed to provide independently variable relative delays between pairs of signals for independent adjustment of electrical tilt of antenna beams associated with different stations.

5. An antenna system according to claim 4 wherein the delaying means incorporates hybrids for combining relatively delayed pairs of signals for relaying to the stations via the signal feeders.

6. An antenna system according to claim 4 wherein the delaying means incorporates frequency conversion means arranged to filter relatively delayed signals at a reduced frequency.

7. An antenna system according to claim 4 wherein the delaying means incorporates local oscillator means for frequency conversion and arranged to enable filtering of relatively delayed signals at a reduced frequency and to implement signal delay by local oscillator signal phase shifting.

8. An antenna system according to claim 1 wherein the stations are located remotely from the antenna, the delaying means is incorporated in an antenna tilt assembly co-located with the antenna and the signal feeders connect the antenna tilt assembly to station circuitry associated with the stations.

9. An antenna system according to claim 8 wherein the station circuitry is arranged to divide signals received via the signal feeders between the stations to provide each station with a receive signal associated with one respective antenna polarisation and a polarisation diversity signal of associated with the other respective antenna polarisation.

10. A method of operating an antenna system having a dual polarised antenna with electrical tilt adjustable polarisations providing polarisation diversity and a respective corporate feed means associated with each antenna polarisation and providing for the electrical tilt of that antenna polarisation to be adjustable in response to relative delay of a plurality of intermediate signals, the method including:
   a) relaying intermediate signals between each antenna polarisation and providing for intermediate signals to be subject to relative delays;
   b) providing a respective signal feeder associated with each antenna polarisation; and
   c) using two stations each for at least one of receiving and transmitting signals via the antenna polarisations and signal feeders, each antenna polarisation being associated with a signal of one respective station and with a polarisation diversity signal of the other respective station.

11. A method according to claim 10 wherein the two stations have contiguous operating frequencies.

12. A method according to claim 10 including providing at least one station for transmitting signals and wherein the intermediate signals are made subject to relative delays by processing the at least one station's transmit signal into two intermediate signals with relative delay therebetween.

13. A method according to claim 10 including providing the stations at least for receiving signals and wherein the intermediate signals are made subject to relative delays by processing a respective plurality of intermediate signals from each corporate feed to provide independently variable relative delays between pairs of signals for independent adjustment of electrical tilt of antenna beams associated with different stations.

14. A method according to claim 13 wherein the intermediate signals are made subject to relative delays by means of hybrids for combining relatively delayed pairs of signals for relaying to the stations via the signal feeders.

15. A method according to claim 13 wherein the intermediate signals are made subject to relative delays by frequency conversion and filtering relatively delayed signals at a reduced frequency.

16. A method according to claim 15 wherein signal delay is implemented by local oscillator signal phase shifting.

17. A method according to claim 10 wherein the stations are located remotely from the antenna, the intermediate signals are made subject to relative delays in an antenna tilt assembly co-located with the antenna and the signal feeders connect the antenna tilt assembly to station circuitry associated with the stations.

18. A method according to claim 17 including using the station circuitry to divide signals received via the signal feeders between the stations and provide each station with a receive signal associated with one respective antenna polarisation and a polarisation diversity signal of associated with the other respective antenna polarisation.

* * * * *